(12) United States Patent
Duan et al.

(10) Patent No.: US 7,246,369 B1
(45) Date of Patent: Jul. 17, 2007

(54) BROADBAND VIDEO DISTRIBUTION SYSTEM USING SEGMENTS

(75) Inventors: Dah-Weih Duan, Yorktown Heights, NY (US); Aparna Pappu, White Plains, NY (US); Monsong Chen, Katonah, NY (US); Bodhi Mukherjee, Hopewell Junction, NY (US)

(73) Assignee: Info Valve Computing, Inc., Elmsbord, NY (US)

( * ) Notice: Subject to any disclaimer, the term of this patent is extended or adjusted under 35 U.S.C. 154(b) by 1028 days.

(21) Appl. No.: 09/748,442

(22) Filed: Dec. 27, 2000

(51) Int. Cl.
*H04N 7/173* (2006.01)
*G06F 12/00* (2006.01)
*G06F 15/173* (2006.01)

(52) U.S. Cl. .................. 725/115; 709/226; 711/114
(58) Field of Classification Search .......... 725/92, 725/91, 93, 94, 95, 96, 97, 114–116; 711/170–173; 709/246, 236
See application file for complete search history.

(56) References Cited

U.S. PATENT DOCUMENTS

| | | | |
|---|---|---|---|
| 5,414,455 A | 5/1995 | Hooper et al. .................. 348/7 |
| 5,550,577 A | 8/1996 | Verbiest et al. ................ 348/7 |
| 5,586,264 A * | 12/1996 | Belknap et al. ............. 725/115 |
| 5,608,448 A | 3/1997 | Smoral et al. ................. 348/7 |
| 5,701,582 A * | 12/1997 | DeBey ....................... 725/103 |
| 5,719,983 A * | 2/1998 | Henderson et al. ........... 386/70 |
| 5,721,823 A * | 2/1998 | Chen et al. ................. 709/203 |
| 5,751,336 A * | 5/1998 | Aggarwal et al. .......... 725/146 |
| 5,805,821 A | 9/1998 | Saxena et al. ......... 395/200.61 |
| 5,899,582 A * | 5/1999 | DuLac ....................... 386/125 |
| 5,926,649 A | 7/1999 | Ma et al. .................... 395/826 |
| 5,930,473 A | 7/1999 | Teng et al. ............ 395/200.34 |
| 5,936,659 A | 8/1999 | Viswanathan et al. ......... 348/7 |
| 5,973,679 A | 10/1999 | Abbott et al. ............... 345/302 |
| 5,996,015 A | 11/1999 | Day et al. ................... 709/226 |
| 6,018,359 A | 1/2000 | Kermode et al. .............. 348/7 |
| 6,061,504 A | 5/2000 | Tzelnic et al. ......... 395/200.49 |
| 6,061,732 A | 5/2000 | Korst et al. ................. 709/231 |
| 6,088,721 A | 7/2000 | Lin et al. .................... 709/214 |
| 6,101,546 A | 8/2000 | Hunt ........................ 709/231 |
| 6,101,547 A | 8/2000 | Mukherjee et al. ......... 709/231 |
| 6,311,251 B1 * | 10/2001 | Merritt et al. .............. 711/114 |
| 6,374,336 B1 * | 4/2002 | Peters et al. ................ 711/167 |

OTHER PUBLICATIONS

"Performance Evaluation of QuickVideo OnDemand (QVOD) Server", Infovalue Computing, Inc. Technical Report IV-TB-QVOD-1999-071-I, Jul. 8, 1999, pp. 1-10, InfoValue Computing, Inc., Elmsford, NY.

(Continued)

*Primary Examiner*—Andrew Y. Koenig
(74) *Attorney, Agent, or Firm*—Saile Ackerman LLC; Stephen B. Ackerman; Billy Knowles

(57) ABSTRACT

A method and apparatus to segment video data files within a video distribution system to facilitate the transfer of the video data files from a file server computing system to client computing system within a video distribution system. The data files are fragmented as a function of demand for the data files, size of each data file of the plurality of data files, amount of retention space available on each of the plurality of data storage devices, and available bandwidth for communication with the client computing systems.

100 Claims, 5 Drawing Sheets

OTHER PUBLICATIONS

"Network Video Computing Via QuickVideo Suite", InfoValue Technical White Paper InfoValue Computing, Inc., Elmsford, NY, 1999.

"New Solution for Transparent Web Caching: Traffic Server 2.1 Supports WCCP", Inktomi Corp., San Mateo, CA, 2000, found http://www.inktomi.com/product/network/traffic/tech/wccp, Aug. 15, 2000.

"Web Distribution Systems : Caching and Replication", Chandbok, Ohio State University, 1999, found http://www.CIS.Ohio-State.edu/~jain/cis788=99/web_caching/index.html, Aug. 15, 2000.

"Network Caching Guide", Goulde, Patricia Seybold Group for Inktomi Corp., pp. 1-42, Boston, MA, Mar. 1999.

"Inktomi Traffic Server—Media Cache Option", Inktomi Corp., San Mateo, CA, 1999, found http://www.inktomi.com, Aug. 15, 2000.

"Implementing Multiplexing, Streaming, and Server Interaction for MPEG-4", Kalva et al., IEEE Transactions On Circuits and Systems for Video Technology, vol. 9, No. 8, Dec. 1999, pp. 1299-1312.

"API Overview," Inktomi Corporation, San Mateo, CA, 2000, found http://www.inktomi.com/products/network/traffic/tech/wccp.

"Web Cache Communication Protocol V2", Cisco Systems, Inc., San Jose, CA, found http://www.cisco/univercd/cc/td/doc/product/software/ios120/120newft/120t/1203/weep-htm, Aug. 15, 2000.

"A Practical Methodology for Guaranteeing Quality of Service for Video on-Demand", Zamora et al., IEEE Transactions on Circuits and Systems for Video Technology, vol. 10, No. 1, Feb. 2000.

* cited by examiner

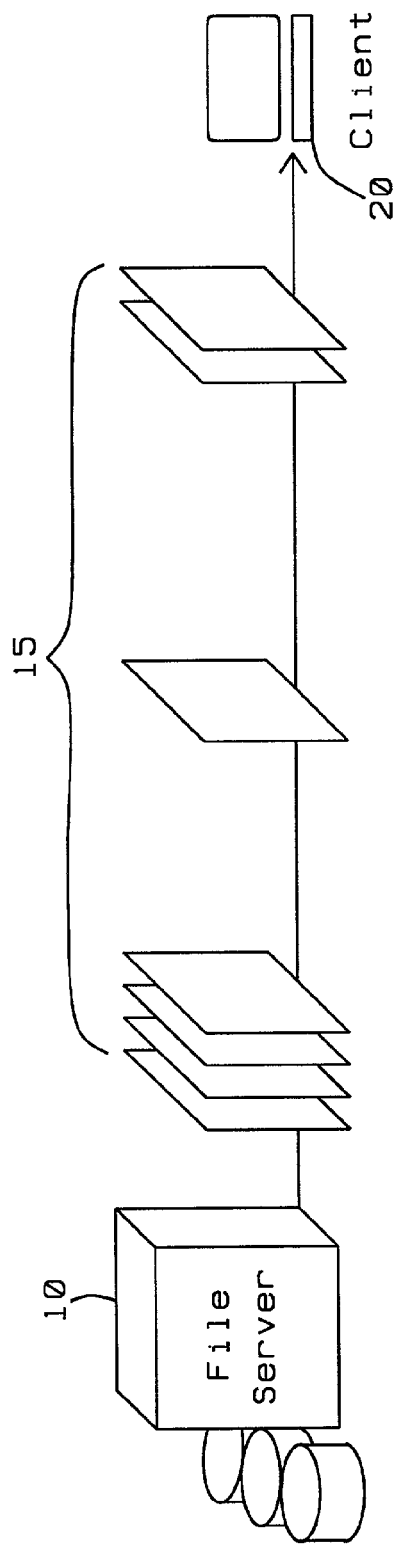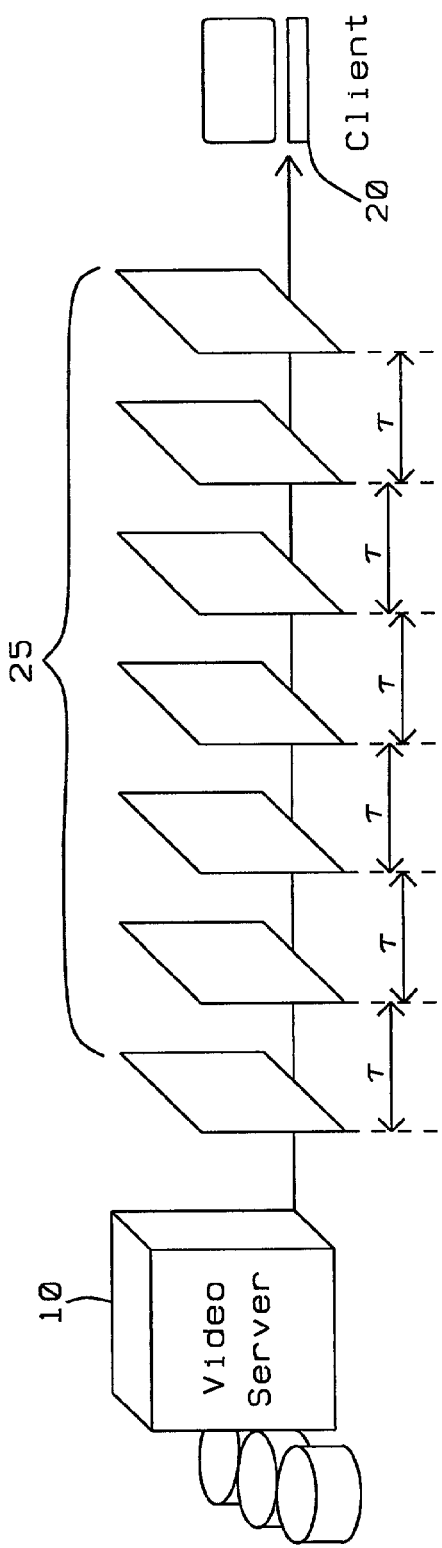
FIG. 1 — Prior Art
FIG. 2 — Prior Art

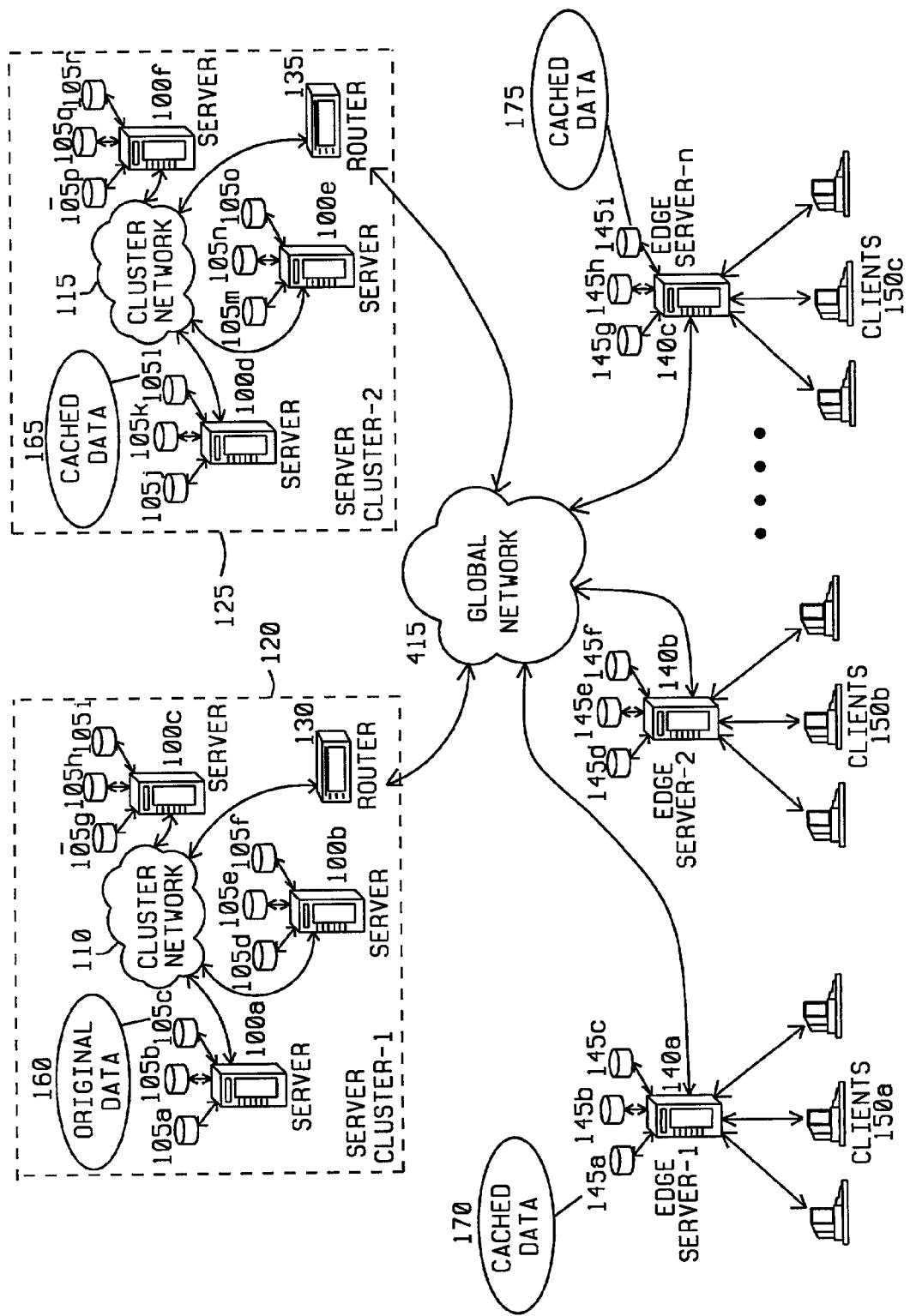
FIG. 3 – Prior Art

BROADBAND VIDEO DISTRIBUTION SYSTEM USING SEGMENTS

RELATED PATENT APPLICATIONS

"A Video Distribution System Using Dynamic Segmenting Of Video Data Files," Ser. No. 09/748,304, Filing Date Dec. 27, 2000, assigned to the same assignee as this invention.

"A Video Distribution System Using Disk Load Balancing by File Copying," Ser. No. 10/025,242, Filing Date Dec. 19, 2001, assigned to the same assignee as this invention.

"A Video Distribution System Using Dynamic Disk Load Balancing with Variable Segmenting," Ser. No. 10/027,991, Filing Date Dec. 20, 2001, assigned to the same assignee as this invention.

"Streaming While Fetching Broadband Video Objects Using Heterogeneous and Dynamic Optimized Segmentation Size," Ser. No. 10/804,658, Filing Date Mar. 19, 2001, assigned to the same assignee as this invention.

"A Hardware Independent Hierarchical Cluster of Heterogeneous Media Servers Using a Hierarchical Command Beat Protocol to Synchronize Distributed Parallel Computing Systems and Employing A Virtual Dynamic Network Topology for Distributed Parallel Computing System," Ser. No. 10/804,657, Filing Date Mar. 19, 2004, assigned to the same assignee as this invention.

BACKGROUND OF THE INVENTION

1. Field of the Invention

This invention relates to the field of transferring Digital Video Disk (DVD) or Broadcast quality video data objects over a packet switched network in such a way that the video is played in a smooth (not jerky) manner. Further, this invention relates to the video distribution systems and methods for segmenting video data objects into multiple files to facilitate the transfer of the video data objects.

2. Description of Related Art

In the past video streaming servers required, that a file be fully present before the server could start streaming the file. This imposed a considerable restriction as typical DVD or broadcast quality videos may be several Gigabytes in size and thus imposed a large latency before a viewer could start viewing a video.

Video is the most dominant medium in entertainment and is rapidly becoming a critical part of computing as well. Video is often used in applications such as virtual reality gaming, for example, to mimic personal or virtual environments, increasing an application's appeal and usability. Video has a large information carrying capacity and is heavily used in capturing and conveying complicated situations such as news events, live interviews, scientific experiments, tourist attractions, and many others.

With the increasing availability of high bandwidth networks, video on-demand applications are gaining popularity on global digital communications networks such as the Internet as well as private and corporate digital communication internal networks commonly referred to as Intranets. Example applications include online training, news broadcasts, educational programming, corporate information, and virtual seminars directly to every desktop computing system or workstation. Similarly, video kiosks can be set up in enterprises and university campuses to display live video and up-to-the-minute news, without ever needing an on-site upgrade.

Video data files, however, occupy huge amounts of space on computers. It requires about 10 MB to store one minute of video in most standard compression and decompression video formats, including Motion Picture Experts Group standard MPEG-1, the Apple Computer Inc. Indeo, Intel Corp. QuickTime, and Super Mac, Inc Cinepak. That translates into 1.2 GB of space for two hours of video, the length of an average feature film. These tremendous storage requirements make effective on-demand sharing of video data files at least as important as conventional file sharing.

However, conventional file servers do not address video's unique requirements and cannot effectively support video sharing. Full-motion video, inherited from analog TV, is a sequence of images played out at constant intervals. The two most common analog video formats are the National Television Standards Committee (NTSC), used in the United States and Japan, and Phase Alternation Standard (PAL), used in Europe. NTSC plays video at 30 frames per second, while PAL plays it at 25 frames per second. The sequence of images in a video clip must be relayed at a constant interval, or else the perceptual quality degrades rapidly: the motion jumps and the sound breaks. This rigid periodic timing property is referred to as the isochronous requirement. Referring now to FIG. 1, conventional file servers 10 are designed for minimal transfer latency. Files 15 are thus transferred to maintain the minimum latency and are transferred as quickly as possible. The files 15 will be interleaved with other digital communication traffic on the network and thus non-isochronously. Without explicit mechanisms to ensure isochronism, delivery rates are irregular, resulting in erratic playback quality at the client computing system 20.

To avoid erratic playback, the usual approach is to download whole files 15 from the server 10 to the client computing system 20 before starting video playback. This approach results in unacceptable delays for most video data files, which are large. For example, even with transfer rates as fast as 1.5 Mb/second, the initial start-up delay is 60 seconds for a one minute video clip.

It is thus desirable to deliver video streams isochronously, as depicted in FIG. 2, so that video playback is guaranteed to have smooth motion and sound. The file server 10 must now transfer or stream the files 25 such that the time between each section of the file is transferred in a time period of $\tau$. The even interval allows the file 25 to arrive isochronously with the first section to be displayed before any of the remaining sections of the file 25 have arrived at the client system 20. This allows a video clip to begin practically instantaneously.

The rapid advances in the speeds of microprocessors, storage, and network hardware may give a false impression that video on-demand (VOD) solutions do not need special purpose video streaming software. Video streaming as shown in FIG. 2 allows efficient playback of full motion videos over networks with guaranteed quality using isochronous timing.

When an operating system's default file transfer mode is used to stream a video data file, faster hardware may accelerate the operating system's transfer rate, but this improved hardware still cannot change the fundamental, erratic behavior of a file transfer as shown in FIG. 1. By default, the file transfer process does not respect the isochronous nature of a video stream. This typically results in a jerky and poor-quality playback of a video stream. The dominant factors of a system's overall streaming performance are the higher level client/server and networking processes, and are not the raw power of the low level physical devices.

U.S. Pat. No. 6,101,546 (Hunt) describes a method and system for providing data files that are partitioned by delivery time and data type. A file is logically partitioned into data channels where each data channels holds a sequence of data of a particular data type. The data channels are logically partitioned into delivery times. The format of the file explicitly sets forth the synchronization between the data channels and the delivery times of data held within the channels. The file format is especially well adapted for use in a distributed environment in which the file is to be transferred from a server to a client. Channel handlers are provided at the client to process respective data channels in the file. The channel handlers are data type specific in that they are constructed to process data of an associated data type. The data in the file may be rendered independently of the delivery time of the data.

U.S. Pat. No. 6,018,359 (Kermode, et al.) illustrates a system and method for multicast video-on-demand delivery system. The video-on-demand system divides video data files into sequentially organized data segments for transmission and playback. Each segment is repeatedly transmitted in a looping fashion over a transmission channel. The rate of transmission is equal to or greater than the playback rate, and the lengths of the segments are chosen such that:
  (i) the receiver tunes into no more than a fixed number of channels (preferably two) at any one time;
  (ii) the receiver tunes into a new channel only after an entire segment has been received from a previous channel; and
  (iii) until a maximum segment length is attained, data is received from no fewer than two channels.

The segments are sequentially presented even as new segments are being downloaded. When the display rate is equal to the transmission rate, it is found that the foregoing conditions are satisfied when the relative lengths of the segments form a modified Fibonacci sequence.

U.S. Pat. No. 5,930,473 (Teng, et al.) discloses a video application server for mediating live video services. The video application server is to be used in a network including source clients and viewer clients connected to one or more shared transmission media. A video server is connected to one of the transmission media and is operative to control the broadcast and storage of multiple live or previously stored video streams. The control may be provided via remote procedure call (RPC) commands transmitted between the server and the clients. In one embodiment, a video presentation system is provided in which a video stream from a source client is continuously broadcast to a number of viewer clients. One or more of the viewer clients may be authorized by the source client to broadcast an audio and/or video stream to the other clients receiving the source video stream. In another embodiment, a multicast directory is provided to each of a plurality of viewer clients by transmitting directory information in a packet corresponding to a predetermined multicast address. The multicast directory indicates to a particular viewer client which of a number of video programs are available for broadcast to that client.

U.S. Pat. No. 6,101,547 (Mukherjee, et al.) describes an inexpensive, scalable and open-architecture media server. The multi-media server provides client systems with streaming data requiring soft real-time guarantee and static data requiring a large amount of storage space. The servers use a pull-mode protocol to communicate with client systems through a real-time network. Separate data and control channels enhance the soft real-time capability of the server. The data channel conforms to an open standard protocol such as such as Transmission Control Protocol (TCP), User Datagram Protocol (UDP), or Real-time Transport Protocol (RTP). A switched data link layer for the control channel permits separate intrahost control messages that may be multicast and broadcast. The distributed file system selects a specific data block size based upon the compression technique employed to enhance soft real-time guarantee. A hierarchical data structure combined with merging empty data blocks minimizes disk fragmentation. Data blocks are striped across multiple disks to improve disk utilization. A local buffer and a queue for both read and write requests provides support for simultaneous read and write data streams.

U.S. Pat. No. 5,805,821 (Saxena, et al.) teaches a video optimized media streamer user interface employing non-blocking switching to achieve isochronous data transfers. The media streamer includes at least one control node; a user interface having an output coupled to at least one control node; at least one storage node for storing a digital representation of at least one video presentation; and a plurality of communication nodes each having an input port for receiving a digital representation of at least one video presentation therefrom. The video presentation requires a time T to present in its entirety, and is stored as a plurality of N data blocks. Each data block stores data corresponding to a T/N period of the video presentation. Each communication nodes further has a plurality of output ports for outputting a digital representation. A circuit switch is connected between the at least one storage node and the input ports of communication nodes for coupling one or more input ports to at least one storage node. The user interface includes a capability for specifying commands for execution, and the at least one control node is responsive to individual ones of the commands for controlling at least one of the at least one storage node and at least one of the plurality of communication nodes, in cooperation with the circuit switch, so as to execute a function associated with individual ones of the commands. The commands may include video cassette recorder-like commands that include commands selected from a group that includes a Load command, an Eject command, a Play command, a Slow command, a Fast Forward command, a Pause command, a Stop command, a Rewind command, and a Mute command. The commands may also include commands selected from a group that includes a Play List command, a Play Length command, and a Batch command. A synchronous application program interface (API) is provided for coupling, via the user interface, a user application program to at least one control node. The API includes Remote Procedure Call (RPC) procedures.

U.S. Pat. No. 5,550,577 (Verbiest, et al.) illustrates a video on demand network, including a central video server and distributed video servers with random access read/write memories. The video on demand network transmits video signals to user stations pursuant to the receipt of control signals issued by these user stations. In order to optimize the retrieval costs, this video on demand network maintains a large video library in a central video server and stores locally popular video signals in a plurality of local distributed video servers from which the latter video signals are transmitted to the user stations. The video signals provided by the local distributed servers are updated from the central server based upon the changing popularity of the video signals. The video on demand network of Verbiest proposes in particular to store the video signals in the local distributed servers in random access read/write memories, e.g., electronic RAMs, magnetic or optical disks from which the video signals can flexibly be supplied on-line to the user stations and to store the video signals in the central server in sequential access memories, e.g. Digital Audio Tapes (DAT) and CD-ROMs (CDR), providing cheap mass storage.

"Performance Evaluation of QuickVideo OnDemand (QVOD) Server," InfoValue Computing, Inc. Technical Report IV-TR-QVOD-1999-07-1-1, Jul. 8, 1999, InfoValue Computing, Inc., Elmsford, N.Y. describes a video on-demand system developed for high performance, effective and flexible, network-based, on-demand sharing of videos. QuickVideo On Demand provides streaming throughput for broadband applications Further, QuickVideo On Demand allows a linearly scalable clustering mechanism which provides support for higher throughputs, if required. Quick-Video On Demand supports all video formats, codecs, networks and applications, and is compatible with any open application platform.

"Network Video Computing Via QuickVideo Suite," InfoValue Technical White Paper, InfoValue Computing, Inc., Elmsford, N.Y., 1999, describes Network Video Computing the core of which is video streaming. Video streaming allows the efficient playing of full-motion video content over networks with guaranteed quality. The rigid timing property of full motion video is referred to as the isochronous timing. File servers are designed to minimize transfer latency during conventional network transfers, and are insensitive to video's unique timing requirement. As a result, delivery rates are irregular and produce erratic playback as described above. Video streaming technologies are real-time network transfers that maintain the video's critical timing property throughout the entire delivery period, as depicted in FIG. 2. This white paper describes the open architecture with a streaming core.

"Web Distribution Systems: Caching and Replication" Chandbok, Ohio State University, 1999, found http://www-.cis.ohio-state.edu/~jain/cis788-99/web_caching/in-dex.html, 8/15/00, provides an overview of the current techniques for caching and replication of digital data on computer systems interconnected through a global or local digital communication network. Refer now to FIG. 3 for a summary of caching in large distributed digital processing networks. Multiple server computing systems 100a, 100b, . . . , 100f are high performance computing systems such as the IBM Corporation RS-6000-SP, The Sun Microsystems, Inc. Enterprise 10000 Server, the Hewlett-Packard Netserver AA-6200, or other server systems. The computer systems 100a, 100b, . . . , 100f are each connected to multiple storage devices 105a, 105b, . . . , 105r. The storage devices 105a, 105b, . . . , 105r are magnetic disk devices, compact disk read only memory (CD-ROM) "juke boxes," or tapes drives. A group of the server systems 100a, 100b, 100c or 100d, 100e, 100f are respectively interconnected through the digital communications cluster network 110 and 115 to form the server cluster 1 120 and the server cluster 2 125. The server cluster 1 120 and the server cluster 2 125 may be resident with in the same enterprise data center or placed at different geographical locations either within the enterprises or even in different enterprises.

The cluster networks 110 and 115 are connected respectively to the network routers 130 and 135. The network routers 130 and 135 are further connected to a public or global digital communications network 155. The global network 155 may be the public Internet or an enterprise's private Intranet.

The server computer systems 100a, 100b, . . . , 100f contain database information systems, storage for files such as audio or video data files, and other data files to accessed by large numbers of people either publicly or privately within an enterprise through the client systems 150a, 1500b, 150c.

Edge servers 140a, 140b, 140c are connected to the global network 155 and thus provide access portals for the client systems 150a, 150b, 160c to the global network 155 to communicate with each other, with other edge servers 140a, 140b, 140c, or with the server computer systems 100a, 100b, . . . , 100f. Each edge servers 140a, 140b, 140c is connected has attached data storage device 145a, 145b, . . . , 145i. The attached data storage device 145a, 145b, . . . , 145i is generally a magnetic disk storage device, but may also include a CD-ROM, magnetic tape, or other storage media.

If a server computer systems 100a, 100b, . . . , 100f has data 160 that is requested by many of the client systems 150a, 150b, 150c, the network traffic to the server computer system 100a may to great for either the global network 155 or the cluster network 110 to carry and maintain a reasonable quality of service. Quality of service in this context means that the original data 160 is transferred repetitively relatively quickly and if the original data 160 is audio or video data files, that the isochronous nature of the transfer of the data is maintained.

If the server clusters 120 and 125 are separated geographically, it may cost less to maintain the quality of service by placing a copy 165 of the original data 160 in a disk 1051 on a second server system 100d. If the copy 165 of the original data 160 is permanent, it is referred to as being replicated. If the copy 165 of the original data 160 is temporary, it is referred to as cached. As the demand for the original data 160 is increased, it may be desirable to either replicate or cache 170 or 175 the data even within the disks 145b or 145i of the edge servers 150a or 150c.

There are many policies developed regarding which of the original data 160 is replicated or cached 165, 170, or 175. Further, the replacement of cached data 165, 170, or 175 by other data that is demanded more often is known and generally follows a least recently used protocol, where the cached data 165, 170, or 175 that has not been requested is replaced by that is more requested.

U.S. Pat. No. 6,088,721 (Lin, et al.) teaches an efficient unified replication and caching protocol. The protocol provides assurance of consistent replication of objects from a central server to caching servers, for example, over data communication networks such as the Internet. It is an application-layer protocol, which guarantees delivery of objects such as files. This protocol insures that objects sent by a source machine such as a server to any number of destination machines such as caching servers actually arrive at the intended caching servers even when the caching servers are temporarily unavailable, for example, due to failure or network partition.

U.S. Pat. No. 6,061,504 (Tzelnic, et al.) illustrates a video data file server using an integrated cached disk array and stream server computer. The video data file server includes an integrated cached disk array storage subsystem and a multiple stream server computers linking the cached disk storage system to the data network for the transfer of video data streams. The video data file server further includes a controller server for applying an admission control policy to client requests and assigning stream servers to service the client requests. The stream servers include a real-time scheduler for scheduling isochronous tasks, and supports at least one industry standard network file access protocol such as Simple Network Management Protocol (SNMP) and one file access protocol Network File System (NFS) for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video data file server provides video-on-demand service by maintaining and dynamically allocating sliding windows of video data in the random access memories of the stream server computers.

"Network Caching Guide," Goulde, Patricia Seybold Group for Inktomi Corp., Boston, Ma, March 1999, describes the various types of caching approaches and the different ways for caches to be implemented. Implementations vary depending on where the cache is placed, who is accessing the cache, and the quantity and type of content that is being cached. Goulde describes the Inktomi Traffic Server from Inktomi Corporation. The Inktomi Traffic Server is capable of delivering fresh content to large numbers of users around the world from a large number of Web servers around the world.

"Inktomi Traffic Server—Media Cache Option", Inktomi Corporation, San Mateo Ca., 1999, found http://www.inktomi.com, 8/15/00, describes the caching option for the Inktomi Traffic Server to support streaming of video data files.

"Implementing Multiplexing, Streaming, and Server Interaction for MPEG-4" Kalva et al., IEEE Transactions On Circuits And Systems For Video Technology, Vol. 9, No. 8, December 1999, pp. 1299-1312, describes the implementation of a streaming client-server system for object-based audio-visual presentations in general and MPEG-4 content in particular. The system augments the MPEG-4 demonstration software implementation (IM1) for PC's by adding network-based operation with full support for the Delivery Multimedia Integration Framework (DMIF) specification, a streaming PC-based server with DMIF support, and multiplexing software. The MPEG-4 server is designed for delivering object-based audio-visual presentations. The system also implements an architecture for client-server interaction in object-based audio-visual presentations, using the mechanism of command routes and command descriptors.

"New Solution for Transparent Web Caching: Traffic Server 2.1 Supports WCCP," Inktomi Corporation, San Mateo Ca., 2000, found http://www.inktomi.com/products/network/traffic/tech/wccp, 8/15/00 describes the use of the Web Cache Control Protocol (WCCP) from Cisco Systems, Inc. within Inktomi Corporation's Traffic Server.

"API Overview," Inktomi Corporation, San Mateo Ca., 2000, found http://www.inktomi.com/products/network/traffic/tech/wccp, 8/15/00, describes the application program interface tools that are available for the Inktomi Corporation's Traffic Server which allow customization or the Traffic Server's event processing thus allowing manipulation of hypertext transaction protocol (HTTP) transactions at any point in their lifetime.

"Web Cache Communication Protocol v2" Cisco Systems, Inc., San Jose, Calif., found http://www.cisco.com/univercd/cc/td/doc/product/software/ios120/120newft/120t/120t3/wccp.htm, 8/15/00, describes the protocol that allows the use a Cisco Cache Engine to handle web traffic, reducing transmission costs and downloading time. This traffic includes user requests to view pages and graphics on World Wide Web servers, whether internal or external to a network, and the replies to those requests. When a user requests a page from a web server (located in the Internet), the router sends the request to a cache engine. If the cache engine has a copy of the requested page in storage, the cache engine sends the user that page. Otherwise, the cache engine retrieves the requested page and the objects on that page from the web server, stores a copy of the page and its objects, and forwards the page and objects to the user. WCCP transparently redirects Hypertext Transfer Protocol (HTTP) requests from the intended server to a cache engine.

"A Practical Methodology For Guaranteeing Quality Of Service For Video-On-Demand," Zamora et al., IEEE Transactions On Circuits And Systems For Video Technology, Vol. 10, No. 1, February 2000, describes an approach for defining end-to-end quality of service (QoS) in video-on-demand (VoD) services. A schedulable region for a video server, which guarantees end-to-end QoS, where a specific QoS required in the video client, translates into a QoS specification for the video server. The methodology is based on a generic model for VoD services, which is extendible to any VoD system. In this kind of system, both the network and the video server are potential sources of QoS degradation. The effects that impairments in the video server and video client have on the video quality perceived by the end user is examined.

As described above, video data files may be very large, on the order of 1.2 GB for a two hour movie or video presentation. In the digital communication networks 110, 115, and 155 of FIG. 3, the files are generally formed into data packets for transfer. These data packets may not arrive to a designated client system 150a, 150b, 150c in correct order for processing. This requires reception of the complete file before processing may begin. If the file is an audio or video data file requiring isochronous presentation of the file, the files must be totally received before processing or the files must be segmented or partitioned into portions to allow smaller units of the files to be processed.

U.S. Pat. No. 5,926,649 (Ma, et al.) teaches a Media server for storage and retrieval of voluminous multimedia data. The Media server provides storage and retrieval of multiple data streams in a multimedia distribution system. A given data stream is separated into a plurality of portions, and the portions are stored in a multi-disk storage system with Y disks each having X zones such that the ith portion of the given stream is stored in zone (i mod X) of disk (i mod Y). The number X of zones per disk and the number Y of disks are selected as relatively prime numbers. The stored data are retrieved using Y independent retrieval schedulers which are circulated among the Y disks over a number of scheduling intervals. Each retrieval scheduler processes multiple requests separated into X groups, with the requests of each group accessing the same disk zone during a given scheduling interval. The retrieval schedulers are also configured such that the retrieval requests of a given retrieval scheduler access the same disk during a given scheduling interval. The data stream placement technique in conjunction with the retrieval schedulers provide sequential-like parallel retrieval suitable for supporting real-time multimedia data distribution for large numbers of clients.

U.S. Pat. No. 5,936,659 (Viswanathan, et al.) illustrates a method for broadcasting movies within channels of a wide band network by breaking the communications path into a number of logical channels and breaking each movie up into a number of segments of increasing size. The first segment of each movie is the smallest segment is transmitted in sequence over the first logical channel and repeated. The second segment of each movie which is proportionately larger than the first segment of each movie is transmitted in sequence over the second logical channel and repeated. This is repeated for the total number of segments which equals the total number of logical channels. The segments are broadcast in such a way that, once the first segment is received at a client location, the subsequent segments are also received in time, so that the movie can be viewed continuously.

U.S. Pat. No. 5,973,679 (Abbott, et al.) describes an indexing method for allowing a viewer to control the mode of delivery of program material. By mapping from time to data position, data delivery can begin at any selected time in the program material. The indexing method also provides for controlling data delivery to begin at the beginning of a frame of data. A synchronizing method is provided to minimize a time offset between audio and video data, particularly in environments using groups of pictures.

U.S. Pat. No. 5,996,015 (Day, et al.) describes a method of delivering seamless and continuous presentation of multimedia data files to a target device by assembling and concatenating multimedia segments in memory. The method provides a multimedia server connected in a network configuration with client computer systems. The multimedia server further includes various functional units which are selectively operable for delivering and effecting the presentation of multimedia files to the client such that a plurality of multimedia files are seamlessly concatenated on the fly to enable a continuous and uninterrupted presentation to the client. In one example, client selected video data files are seamlessly joined together at the server just prior to file delivery from the server. The methodology includes the analog to digital encoding of multimedia segments followed by a commonization processing to ensure that all of the multimedia segments have common operating characteristics. A seamless sequential playlist or dynamically created playlist is assembled from the selected and commonized segments and the resources needed to deliver and play the playlist are reserved in advance to assure resource availability for continuous transmission and execution of the playlist. At a predetermined point prior to an end point of each selected multimedia segment, the next selected segment is initialized and aligned in memory in preparation for a seamless switch to the next segment at the end of a previous segment, thereby providing a seamless flow of data and a continuous presentation of a plurality of selected multimedia files to a client system.

U.S. Pat. No. 5,608,448 (Smoral, et al.) describes a hybrid architecture for a video on demand server. The processing requirement at each computing element in a video server for a video on demand (VOD) system is reduced to only those needed for VOD, resulting in a less expensive processor with less memory and, hence, lower cost. A hybrid video server architecture combines the features of massive parallel processor (MPP) and workstation designs. Since it is not necessary to run a parallel relational database program in order to accomplish VOD data distribution, a unique type of switch element that is well matched to the VOD server problem is employed. By matching this switch element technology to an appropriate data storage technique, a full featured, responsive VOD server is realized.

U.S. Pat. No. 6,061,732 (Korst, et al.) describes a data streaming system utilizing an asynchronous technique for retrieving data from a stream server. In an audio/video server blocks of data are read from a storage medium by a reader and supplied to users in the form of data streams. The storage medium comprises a plurality of record-carrier based storage units. A reader reads a batch of data units from a storage unit in a single relative movement of a reading head of the storage unit with respect to the record-carrier of the storage unit. A scheduler controls reading of blocks from the storage medium by determining from which storage unit(s) data unit(s) need to be read for the block and placing a corresponding carrier access request in a read queue. The scheduler extracts for each of the storage units a batch of carrier access requests from the queue and issues the batch to the reader in an asynchronous manner, in response to the reader having substantially completed reading data units for a previous batch for the storage unit.

U.S. Pat. No. 5,414,455 (Hooper, et al.) teaches a segmented video on demand system. In the system for distributing videos, multiple videos are stored on a mass storage device. Each video includes a plurality of frames of digitized video data for playback on a viewing device. The system includes a memory buffer for storing a segment of a selected one of the videos. The segment includes a predetermined number of frames representing a predetermined time interval of the selected video. In addition, the memory buffer including a write pointer and a read pointer. Software controlled servers are provided for witting and reading video data of the selected video to and from the memory buffer, independently, at locations indicated by the write and read pointers to transfer the selected video to the viewing device.

SUMMARY OF THE INVENTION

An object of this invention is to provide a method and apparatus to segment video data files within a video distribution system.

Further another object of this invention is to provide a method and apparatus to segment video data files to facilitate the transfer of the video data files from a file server computing system to client computing system within a video distribution system.

To accomplish these and other objects a data service system is in communication with multiple computing systems to provide at least one data file of many data files to at least one of the computing systems. The data service system has multiple data file storage devices in communication with each other and with any of the computing systems. Further the data service system has a segmentation apparatus in communication with the plurality of data file storage devices to fragment any of the data files into a plurality of segments to allow transfer to and processing by at least one of the computing systems. The segmentation apparatus fragments each data file as a function of demand for the data files, size of each data file of the plurality of data files, amount of retention space available on each of the plurality of data storage devices, and available bandwidth for communication with the plurality of computing systems.

The segmentation apparatus begins the segmentation of the data file by requesting a range of addresses within a storage device containing the data file. The segmentation apparatus then determines a number of storage devices available to retain a the segments of the data file. A maximum data transfer load for the storage devices is then determined. A minimum segment size which is the smallest amount of data to be contained within one segment of the data file is then assigned. A first segment size is calculated as a first function of a number of the storage devices, the current data transfer load, the maximum data transfer load, and the minimum segment size. The size of a last segment is assigned as the minimum segment size. The remaining segment sizes are calculated as a second function of the number of the storage devices, the current data transfer load, the maximum data transfer load, and the minimum segment size. The data file is then partitioned into segments such that the first segment of the data file is of the first segment size, the last segment of the data file is of the last segment size, and all the remaining segments of the data file is of the remaining segment sizes. Once the data file has been segmented, the storage devices that retain each segment of the data file are assigned and the address within the storage devices to identify the location of an assigned segment is assigned. Further, a name for each segment of the data file is generated by the segmentation apparatus.

The first function to determine the first segment size is found by the formula:

$$Seg1 = \min(SegSize_{min}, V/f)$$

where
Seg1 is the first segment size,
min is the minimum function of two variables,
$SegSize_{min}$ is the minimum segment size allowed during the fragmenting of the video data file, The minimum segment size is empirically determined and is usually about 5 second of the playing time of the video data file.
V is a total size of the digital data file, and
f is determined by the formula:

$$f = N_d + \left(\frac{M_l}{M_l - C_l}\right)$$

where
$N_d$ is the number of storage devices available to retain the segments of the digital data file,
$M_l$ is the maximum digital data transfer load for the data storage devices, and
$C_l$ is the current digital data transfer load of the data storage devices.

The second function to determine the remaining segment sizes is found by the formula:

$$Segn = \max(SegSize_{min}, V/f)$$

where
Segn is the a segment size for one segment of the remaining segments,
max is the maximum function of two variables,
$SegSize_{min}$ is the minimum segment size allowed during the fragmenting of the video data file,
V is a total size of the digital data file, and
f is determined by the formula:

$$f = N_d + \left(\frac{M_l}{M_l - C_l}\right)$$

where
$N_d$ is the number of storage devices available to retain the segments of the digital data file,
$M_l$ is the maximum digital data transfer load, and
$C_l$ is the current digital data transfer load, The segmentation apparatus further determines a file usage factor describing a number of requests for the data file for a period of time and a file interactivity factor describing a number of jumps by the second computing system within the data file. The first and second function are dependent upon the file usage factor and/or the file interactivity factor. The first function to determine the first segment size is now found by the formula:

$$Seg1 = \min(SegSize_{min}, V/f)$$

where
Seg1 is the first segment size, min is the minimum function of two variables,
$SegSize_{min}$ is the minimum segment size allowed during the fragmenting of the video data file,
V is a total size of the digital data file, and
f is determined by the formula:

$$f = N_d + \left(\frac{M_l}{M_l - C_l}\right) + H + I$$

where
$N_d$ is the number of storage devices available to retain the segments of the digital data file,
$M_l$ is the maximum digital data transfer load,
$C_l$ is the current digital data transfer load,
H is the file usage factor, and
I is the file Interactivity factor.

The second function to determine the remaining segment sizes is found by the formula $$Segn = \max(SegSize_{min}, V/f)$$

where
Segn is the a segment size for one segment of the remaining segments,
max is the maximum function of two variables,
$SegSize_{min}$ is the minimum segment size allowed during the fragmenting of the video data file,
V is a total size of the digital data file, and
f is determined by the formula:

$$f = N_d + \left(\frac{M_l}{M_l - C_l}\right) + H + I$$

where
$N_d$ is the number of storage devices available to retain the segments of the digital data file,
$M_l$ is the maximum digital data transfer load,
$C_l$ is the current digital data transfer load,
H is the file usage factor, and
I is the file Interactivity factor.

If either the file usage factor or the interactivity factor are not considered in the above formula, their values are set to zero.

In the data service system of this invention, the data file is a video data file to be transferred isochronously to the computing system.

BRIEF DESCRIPTION OF THE DRAWINGS

FIG. 1 is a diagram of the transfer of files on a digital communications network of the prior art requiring minimal latency.

FIG. 2 is a diagram of the transfer of files on digital communications network of the prior art illustrating isochronous file transfer.

FIG. 3 is a diagram of a distributed computer network system illustrating replication of files in caches of the prior art.

DETAILED DESCRIPTION OF THE INVENTION

Figure 4:
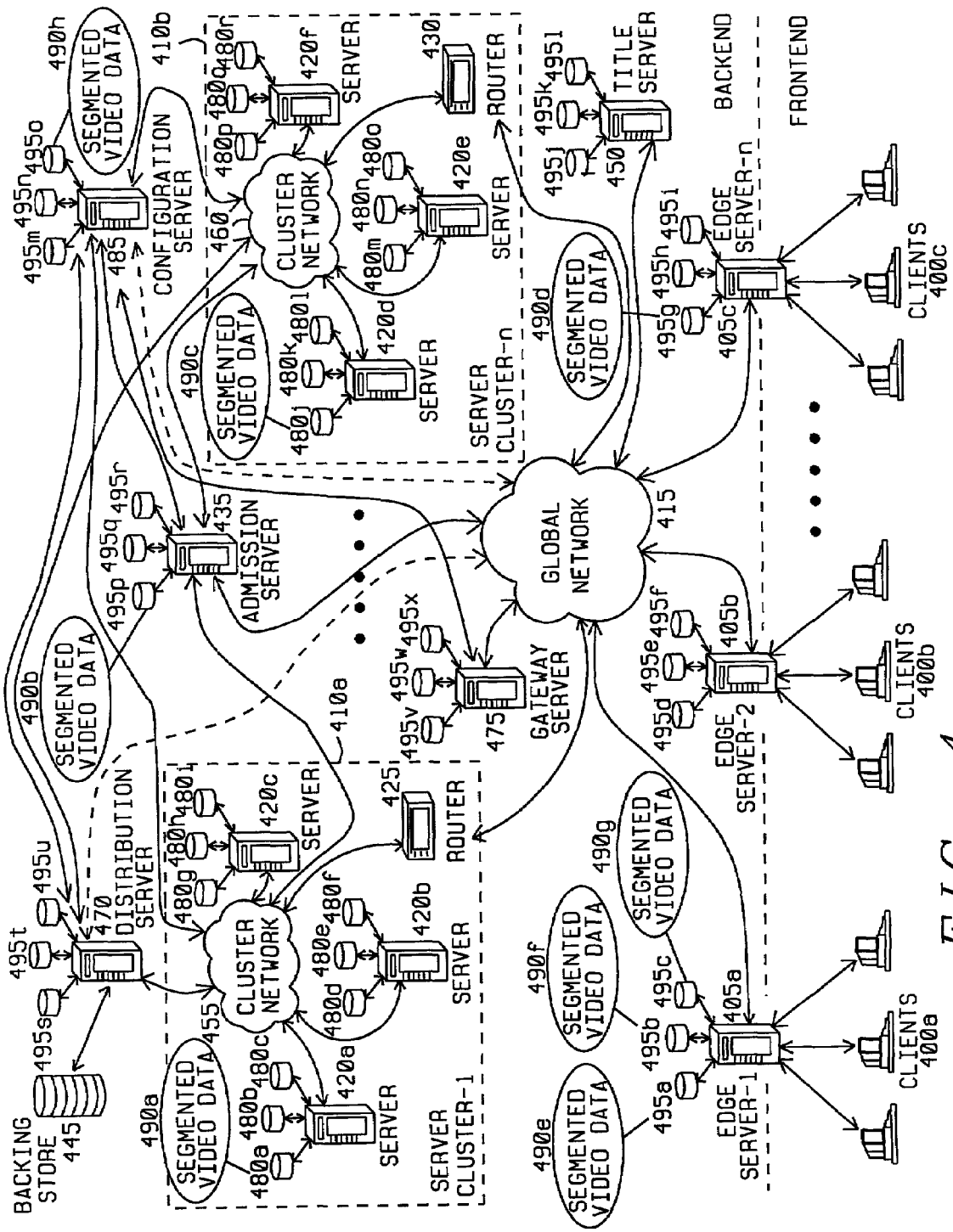
FIG. 4 is a diagram of a distributed computer network system illustrating segmentation of files of this invention.

Refer now to FIG. 4 for a description of a video distribution system of this invention. The client computing systems 400a, 400b, 400c are connected through a communications link to an edge server 405a, 405b, 405c. Each edge server 405a, 405b, 405c acts as an interface for the client computing systems 400a, 400b, 400c to a global communications network 415. The edge servers 405a, 405b, 405c are at the boundary between the "front-end" and the "back-end" of the video distribution system. The front-end being the client computing systems 400a, 400b, 400c that are the terminal points whereby the users can access the video distribution system. Further the edge servers 405a, 405b, 405c are generally internet service providers to which the client computing systems 400a, 400b, 400c are in communication.

The backend of the video distribution system has server systems 420a, . . . , 420f that are grouped together to form server clusters 410a, . . . , 410b. The server systems 420a, 420b, and 420c are interconnected together through the cluster network 455. The server systems 420d, 420e, and 420f are interconnected together through the cluster network 460. The router 425 provides an interface for the server cluster 1 410a to the global communication network 415. Likewise, the router 430 provides an interface for the server cluster n 410b to the global communication network 415.

The gateway server 475 is connected through the global communication network 415 to the edge servers 405a, 405b, 405c and thus to the client computing systems 400a, 400b, 400c. The gateway server 475 is the central point of contact for incoming requests to the system from the client computing systems 400a, 400b, 400c. When a client computing systems 400a, 400b, 400c requests a video data file (on demand) or join a broadcast (multicast) of a video data file, it first contacts the gateway server 475. The gateway server 475 maintains an updated list of the server systems 420a, . . . , 420f in the system. Based on the location of the client computing systems 400a, 400b, 400c and the type of request, it routes the request to the appropriate server systems 420a, . . . , 420f.

A large-scale system containing thousands of video data files must offer an efficient and easy to use content management service to the client computing systems 400a, 400b, 400c. Such a content management service includes capabilities to add/delete, categorize, and browse video data files and is provided by the title server 450. In presence of a dedicated title server 450, the gateway server 475 redirects the client computing systems 400a, 400b, 400c requests to the title server 450. In absence of such a dedicated title server 450, the gateway server 475 can be configured to provide content 1 management services to client computing systems 400a, 400b, 400c. Client computing systems 400a, 400b, 400c, then, browse video data file in the gateway server.

In a geographically distributed broadband a video distribution system of this invention, there will be multiple title servers 450, each for a service region. The gateway server 475 will route the client computing systems 400a, 400b, 400c requests to appropriate title servers 450 based on the location of the client computing systems 400a, 400b, 400c.

A distribution server 470 is used to introduce new contents in the a video distribution system of this invention. Once a new video data file is available, a media distributor uses this service to propagate the title to different service regions of a geographically distributed system. The distribution server 470 consists of four distinct components. A Distribution Center, which is a remote service, is used by media distributors to push new video data files to regional server systems 420a, . . . , 420f. A Distributor Console, a web based remote graphical user interface (GUI), is used to specify locations and contents to be pushed to remote server systems 420a, . . . , 420f. A set of Asset Managers, which are local to regional server systems 420a, . . . , 420f, is responsible for managing and tracking contents in the regional server systems 420a, . . . , 420f. A set of asset databases, one database per regional server system 420a, . . . , 420f, which stores the meta data for the available contents (video data files) in that regional server systems 420a, . . . , 420f. Asset managers use this database to keep track of local video data files. Multiple asset managers can share one asset database. The title server 450 also uses this database to generate a categorized, browsable list of video data files.

A media distributor uses the distributor console to schedule distribution of new media data objects (video data files) to the a video distribution system of this invention. The new video data files may reside in a tertiary storage 445 such as a robotic DVD. The media distributor specifies when to push the title, the list of target regional sites, and the textual meta data related to the video. Among other things, the meta data of a title will possibly contain information required to categorize it as well as a set of searchable strings which can be used to search the content of the video data files. The distributor console connects with the remote distribution center 470 and delivers the schedule. The distributor console contacts the asset managers in the specified target server systems 420a, . . . , 420f, and schedules the delivery of the new content. Once an server systems 420a, . . . , 420f, receives the new video data file, it first stores the content in any available space in a local disk 480a, . . . , 480r. Then, it updates the asset database with the information on the new video data file (including the received meta data on the video data file). If it does not have any available space, it replaces an old video data file using a programmed policy.

Based on the client computing systems 400a, 400b, 400c request (browsing by category, or searching using a string), the title server 450 queries the asset database, and creates a list of video data files for the client computing systems 400a, 400b, 400c to browse. The title server 450 uses aggressive caching techniques to improve the performance of the query. When new information is added in the asset database, the cache in the title server 450 is invalidated.

It is sometimes possible for a title server 450 to have information on a video data file, which is not wholly available in the local storage 480a, . . . , 480r, for various reasons. Portions of the video data file may have been replaced because the asset manager needed space for a new video data file, or only a portion of a video data file was propagated from the distribution center. Once a client computing systems 400a, 400b, 400c requests such a video data file, server system 420a, . . . , 420f, fetches the video data file to the local storage 480a, . . . , 480r. The server system 420a, . . . , 420f allocates free space in the local storage 480a, . . . , 480r possibly by replacing a portion of a resident video data file. The server system 420a, . . . , 420f contacts the distribution server 470 providing the name of the video data file and the remaining portion of the video data file. Once the distribution server 470 is ready, the server system

420a, ..., 420f fetches the remaining portion of the video data file, stores it in the allocated free space, and updates the asset database.

Once user of a client computing systems 400a, 400b, 400c selects a video data file to be viewed, it contacts the admission server 435, which based on the bandwidth requirements and the file location of the video data file, assigns a video server system 420a, ..., 420f from the server clusters 410a, 410b.

The admission server 435 provides a set of mechanisms which are used to implement different policies for load balancing. The admission server 435 maintains a cluster topology, a disk usage table, a node usage table, and a cluster map. The cluster topology maintains the connection information of the cluster. It itemizes a list of server systems 420a, ..., 420f of a server cluster 410a, 410b which can access any of the disks 480a, ..., 480r. The cluster topology contains the server system 420a, ..., 420f identification that is the mount point where a disk 480a, ..., 480r is mounted, and the access status of the disk 480a, ..., 480r.

The disk usage table maintains the capacity (maximum data rate in Mbps) and the current load (data rate in Mbps) for each disk 480a, ..., 480r in the server cluster 410a, 410b. The node usage table maintains the streaming capacity (maximum data rate in Mbps) and the current load for each node in the server cluster 410a, 410b. The cluster maintains an up to date list of network address (internet protocol address), port and the status of the important server system 420a, ..., 420f in the distribution system, and it maintains a list of server systems 420a, ..., 420f in the cluster 410a, 410b, their network addresses and their status. A server systems 420a, ..., 420f can be in one of two states: Live (L) and Failed (D). Additionally, the admission server 435 maintains a supporting data structure, required to provide fault tolerance and authenticated access to the server cluster 410a, 410b. The data structure maintains a table containing the list of active sessions per server system 420a, ..., 420f, and a similar table for active sessions per disk 480a, ..., 480r.

The configuration server 485 allows an administrator to define and to configure server clusters 410a, 410b and the distributed server installations. It maintains an up to date information of the distributed installation using a periodic monitoring mechanism and asynchronous update events from the servers 420a, ..., 420f in the system.

Figure 5:
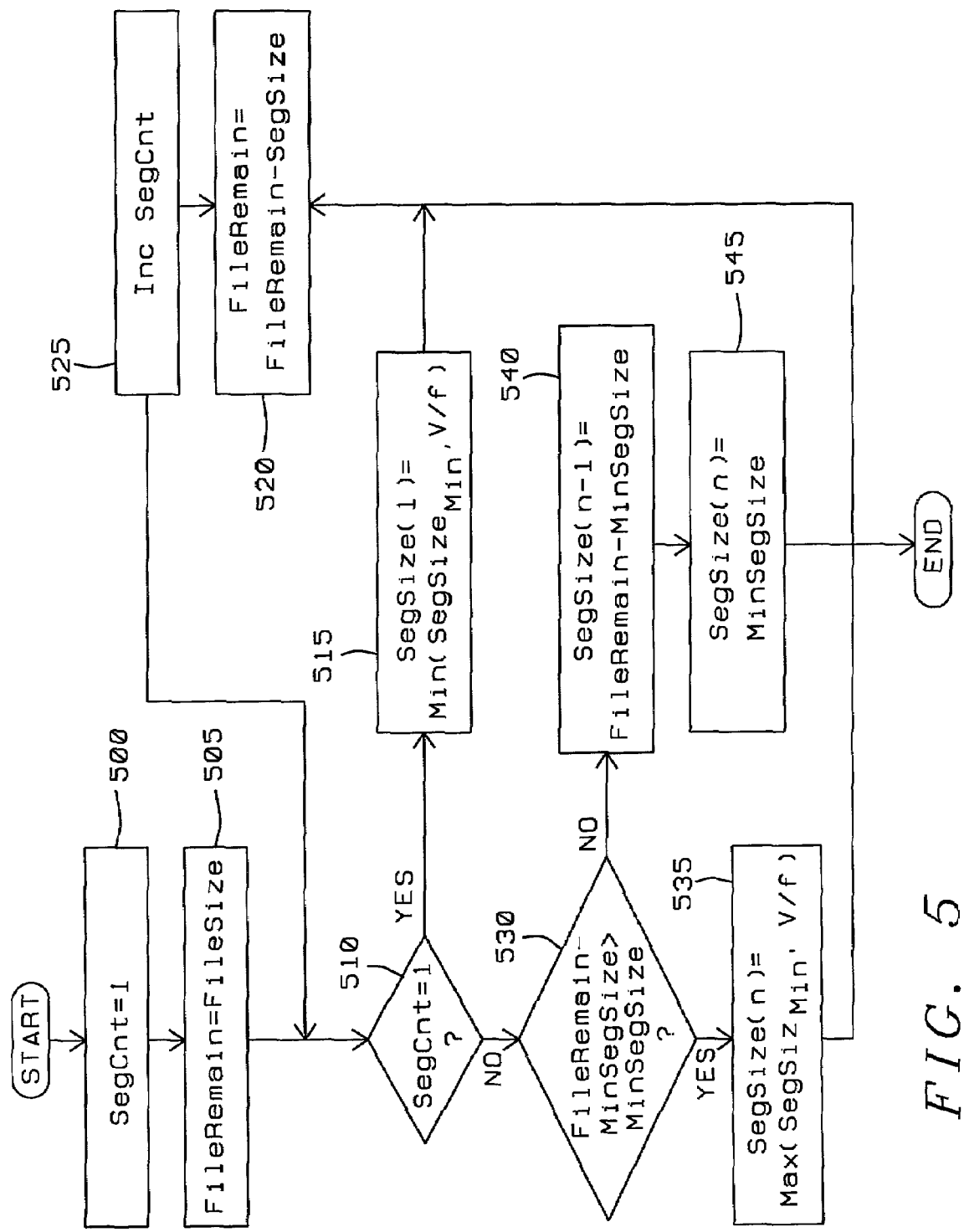
FIG. 5 is a flow diagram illustrating the method of segmentation of files of this invention.

As described, the video data files may be several gigabytes in size. In order to facilitate the transfer of the video data files to client computing systems 400a, 400b, 400c for viewing by a user, it is desirable to fragment the video data file into smaller segments. Each segment is assigned a file name and a location within any of the disks 480a, ..., 480r. The admission server 435 acts as a segmentation apparatus. To perform this function, the admission server 435 executes the method as shown in FIG. 5.

The segmentation process begins once a client computing system 400a, 400b, 400c has contacted the admission server to request a video data file. If the requested video data file is not resident at any of the server systems 420a, ..., 420f, the admission server 435 requests that the distribution server 470 to transfer a copy of the video data file for caching to the disks 480a, ..., 480r. Prior to the transferring of the video data file to the disks 480a, ..., 480r, the admission server creates a listing of the video data files. The listing of the segmentation contains the file name and the designated disk location of the segmented video data file.

The method begins by initiating 500 a segment counter to indicate a first segment of the video data file. A file remaining indicator denotes the amount of the video data file remaining to be segmented. The file remaining indicator is set 505 to the total file size of the requested video data file.

The segment counter is then tested 510 to indicate whether the first segment is being created. During the creation of the first segment, the first segment size is determined 515 by the formula:

$$\text{Seg1} = \min(\text{SegSize}_{min}, V/f)$$

where
Seg1 is the first segment size,
min is the minimum function of two variables,
$\text{SegSize}_{min}$ is the minimum segment size allowed during the fragmenting of the video data file, The minimum segment size is empirically determined and is usually about 5 second of the playing time of the video data file.
V is a total size of the digital data file, and
f is determined by the formula:

$$f = N_d + \left(\frac{M_l}{M_l - C_l}\right) + H + I$$

where
$N_d$ is the number of storage devices available to retain the segments of the digital data file,
$M_l$ is the maximum digital data transfer load,
$C_l$ is the current digital data transfer load,
H is the file usage factor (to be discussed hereinafter), and
I is the file Interactivity factor (to be discussed hereinafter).

The file remaining indicator is decremented 520 by the size of the first segment size and the segment counter is incremented 525 to the next segment to have its size determined.

The file remaining indicator less the minimum segment size is compared 530 to the minimum segment size. If the file remaining indicator less the minimum segment size is not less than the minimum segment size, the next segment is now determined by the formula:

$$\text{Segn} = \max(\text{SegSize}_{min}, V/f)$$

where
Segn is the a segment size for one segment of the remaining segments,
max is the maximum function of two variables,
$\text{SegSize}_{min}$ is the minimum segment size allowed during the fragmenting of the video data file,
V is a total size of the digital data file, and
f is determined by the formula:

$$f = N_d + \left(\frac{M_l}{M_l - C_l}\right) + H + I$$

where
$N_d$ is the number of storage devices available to retain the segments of the digital data file,
$M_l$ is the maximum digital data transfer load,
$C_l$ is the current digital data transfer load,
H is the file usage factor (to be discussed hereinafter), and I is the file Interactivity factor (to be discussed hereinafter).

The file remaining indicator is now decremented 520 by the new segment size and the segment counter is incremented 525 to the next segment for which the size is to be determined.

This determining of the subsequent segment size continues until the size of the file remaining less the minimum segment size is less than the minimum segment size. At this point, the next to the last segment (n−1) is set 540 to the size of the file remaining less the minimum segment size. The last segment is set 545 to the minimum segment size.

The admission server 435 then assigns file names to each segment described in the segment listing and allocates locations within the disks 480*a*, . . . , 480*r* of the server systems 420*a*, . . . , 420*f*. The segmented video data file 490*a* is transferred from the distribution server 470 to the server systems 420*a* to be written to the disks 480*a*, 480*b*, 480*c*.

The video distribution system as shown in FIG. 4 illustrates a system having local cluster networks 455, and 460, and the global communication network 415. It is apparent that the server clusters 410*a* and 410*b* do not require the cluster networks 455 and 460 to virtually construct the server clusters 410*a* and 410*b*. Further, the disks 480*a*, . . . , 480*r* may be grouped in such fashion that they can be associated with one or more of the server systems 420*a*, . . . , 420*f*. The generalized structure allows the configuration server 485 to allocate the functions of the system to any of the server systems 420*a*, . . . , 420*f*. For instance the admission server 435 and the gateway server 475 may in fact be the same computing system and additionally, may be one of the server systems 420*a*, 420*f*. Also, any of the edge servers 405*a*, 405*b*, or 405*c* may physically be on of the server systems 420*a*, . . . , 420*f*.

The segments of the video data files 490*a* are shown as distributed over multiple disks 480*a*, 480*b*, and 480*c*, associated with the server system 420*a*. Depending on the file usage factors, and the interactivity factors, various segments or copies of segments 490*a*, . . . , 490*h* may be placed at other server systems 420*a*, . . . , 420*f*, on the admission server 435, the configuration server 485, or even an edge server 405*a*, 405*b*, or 405*c*. The distribution of the segments 490*a*, . . . , 490*h* allows the balancing of the loading (the amount of data being transferred) of the disks 480*a*, . . . , 480*r* and disks 495*a*, . . . , 495*x*. The admission server 435 controls the placement of the segments and will eliminate segments of video data file based on a policy that will erase those segments that are least recently used, starting at the end of a video data file. Thus certain video data files may have a low number of segments present on the disks 480*a*, . . . , 480*r* of the server systems 420*a*, . . . , 420*f*. A request for a video data file having segments missing requires that the distribution server 470 recreate the segments of the video data file requested and transfer them to the server systems 420*a*, . . . , 420*f*. However, those video data file segments at the beginning of the video data file can be transferred to the client system 400*a*, 400*b*, 400*c* for viewing, while the distribution server 470 is recreating those missing segments.

The file usage factor as cited above is a measure of demand for a video disk file. It is indicative of such factors as the number of requests for a given video data file, the timing of the requests over a period of time, and the geographical distribution of the requests. The interactivity factor, as cited above, is a measure of how often a user causes an interruption of the processing of the video data files to replay a portion of the video data file, accelerate playing of the video data file (fast forward), skip a portion of the video data file, or pause a particular frame of the video data file. These functions are similar to the functions performed by a video cassette recorder (VCR).

As described above, if the video data file is transferred as a whole file, the whole video data file must be present at the client system 400*a*, 400*b*, 400*c* in order for a user to begin viewing of the video data file. This latency degrades the quality of service experienced by the user. Thus, the segmenting is advantageous. However, if the video data files is relatively small segmenting is not needed. Therefore, the size of the video data file is a factor cited above in determining the segment size.

The load or the amount of data being transferred to or from an individual disks 480*a*, . . . , 480*r* and 495*a*, . . . , 495*x* is allocated between a read action (transferring the video data file isochronously to a client system 400*a*, 400*b*, 400*c* for viewing by a user), a write action (transferring the video data file to a disk 480*a*, . . . , 480*r* and 495*a*, . . . , 495*x*), or a copy action (a disk to disk transfer of the video data file). The total bandwidth or transfer rate for a single disk is thus divided in the read action, the write action, or the copy action. The load of the individual disks 480*a*, . . . , 480*r* and 495*a*, . . . , 495*x* is the amount of the total bandwidth consumed for the transfer of the requested video data files resident on the disk. Therefore, the segment size is determined by the number of disks 480*a*, . . . , 480*r* and 495*a*, . . . , 495*x* available to contain the video data file (some maybe off line or too full to accept the video data file) and the loading of the available disks.

Figure 6:
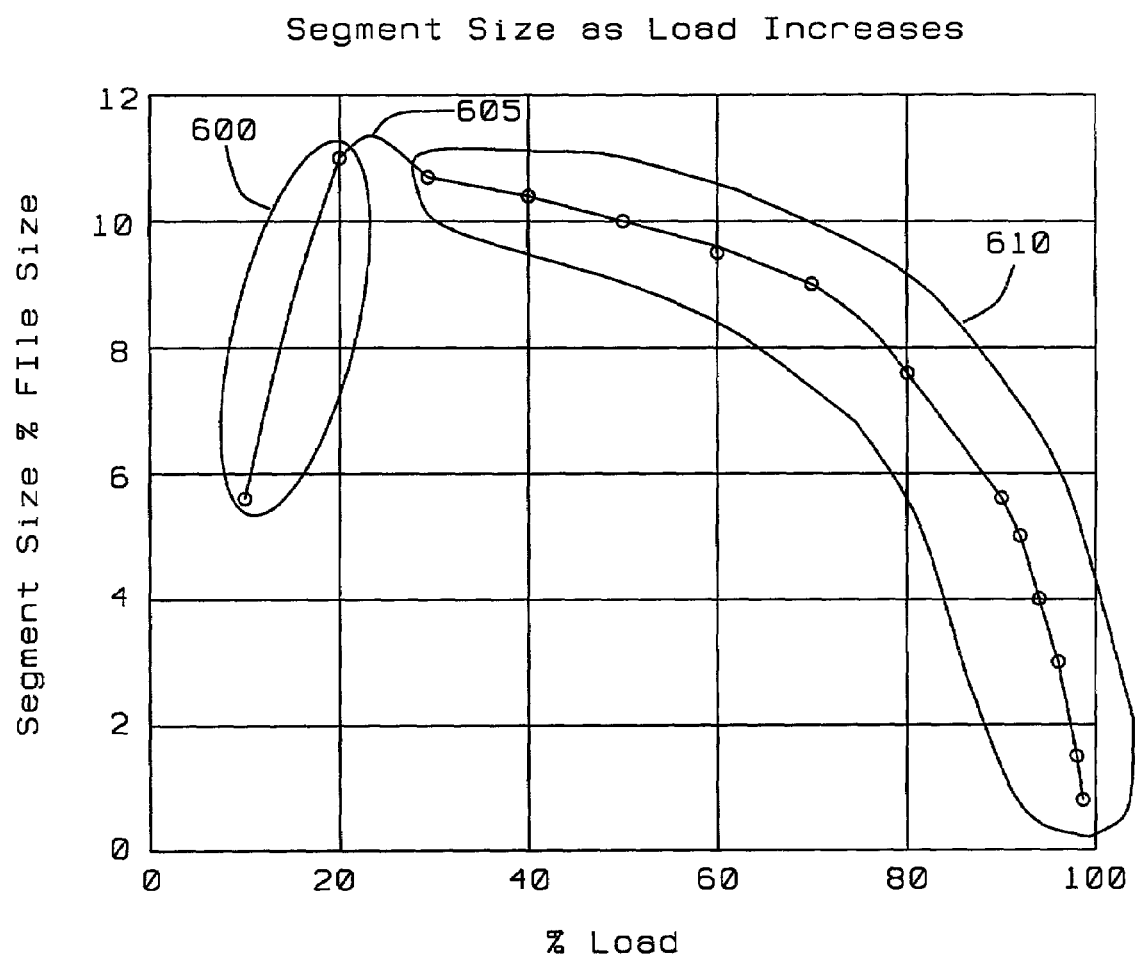
FIG. 6 is a graph illustrating the effect on segment size as a function of disk loading of this invention.

Refer now to FIG. 6 for an illustration of the effect of disk loading on segment size. The vertical axis of the graph of FIG. 6 is segment size as a percentage of the total file size. The horizontal axis is the percent of loading for a given set of disks allocated to contain the video data file.

At a low loading 600 below the break point 605, segment size is controlled by other factors such as the number of requests for a video data file over a period of time and user interactivity become dominant and thus determine segment size. As the loading increases, above the break point 605, the segment size decreases over the range 610 to become very small.

It is well known in the art that while the above describes a system to distribute video data files to client systems, the apparatus is implemented as a program code for execution on a computing system. The program code maybe obtained from media such as storage nodes of the cluster network or the global communication network, or stored on storage media such a read only memory (ROM), or a magnetic disk. The program code executed by the computing system executes the method for segmenting video data files to facilitate the transfer of the video data files. The program executed is as described in FIG. 5.

While this invention has been particularly shown and described with reference to the preferred embodiments thereof, it will be understood by those skilled in the art that various changes in form and details may be made without departing from the spirit and scope of the invention.

The invention claimed is:

1. A method for facilitating transfer of a data object retained by at least one computer-readable data storage device in communication with a first computing system from said first computing system to a second computing system and thence to a second computer-readable data storage device, comprising the step of segmenting said data object into a plurality of data object segments retained by said computer-readable data storage devices, said segmenting said data object comprising the steps of:

requesting a range of addresses within said first computer-readable data storage device containing said data object;

determining a number of computer-readable storage devices in communication with said first computing system available to retain a plurality of segments of said data object;

determining a maximum digital data transfer load for the computer-readable storage devices in communication with said first computing system;

assigning a minimum segment size which is the smallest amount of digital data to be contained within one segment of the data object;

calculating a first segment size as a first function of a number of the computer-readable storage devices, the current digital data transfer load, the maximum digital data transfer load, and the minimum segment size;

assigning a last segment size as the minimum segment size;

calculating all remaining segment sizes as a second function of the number of the computer-readable storage devices, the current digital data transfer load, the maximum digital data transfer load, and the minimum segment size; and partitioning said data object into said plurality of data object segments to be retained by said computer-readable data storage devices whereby a first data object segment is of the first segment size, a data object last segment is of the last segment size, and all remaining data object segments are of the remaining segment sizes.

2. The method of claim 1 wherein said segmenting further comprises the steps of:

assigning one of the number of computer-readable storage devices to retain each of the plurality data object segments;

assigning an address within the computer-readable storage devices to identify the location of an assigned segment;

assigning an object name to each of the plurality of data object segments; and transferring each segment to its assigned computer-readable storage device.

3. The method of claim 1 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right)$$

where
$N_d$ is the number of computer-readable storage devices available to retain the data object segments,
$M_l$ is the maximum digital data transfer load, and
$C_l$ is the current digital data transfer load.

4. The method of claim 1 wherein the second function to determine the remaining segment sizes is:

Segn=max(SegSize$_{min}$, V/f)

where
Segn is the a segment size for one data object segment of the remaining data object segments,
max is the maximum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right)$$

where
$N_d$ is the number of computer-readable storage devices available to retain the segments of the data object,
$M_l$ is the maximum digital data transfer load, and
$C_l$ is the current digital data transfer load.

5. The method of claim 1 wherein said segmenting further comprises the step of:

determining a file interactivity factor describing a number of jumps by the second computing system within the data object during processing by said second computing system.

6. The method of claim 5 wherein the first function is further dependent upon the file interactivity factor.

7. The method of claim 6 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right) + I$$

where
$N_d$ is the number of computer-readable storage devices available to retain the data object segments,
$M_l$ is the maximum digital data transfer load,
$C_l$ is the current digital data transfer load, and
I is the file interactivity factor.

8. The method of claim 5 wherein the second function is further dependent upon the file interactivity factor.

9. The method of claim 8 wherein the second function to determine the remaining segment sizes is:

Segn=max(SegSize$_{min}$, V/f)

where
Segn is the a segment size for one data object segment of the remaining data object segments,
max is the maximum function of two variables,
SegSize$_{min}$ is the minimum segment size allowed during the fragmenting of said data object, V is a total size of the data object, and
f is determined by the formula:

$$f = N_d + \left(\frac{M_l}{M_l - C_l}\right) + I$$

where
  $N_d$ is the number of computer-readable storage devices available to retain the data object segments,
  $M_l$ is the maximum digital data transfer load,
  $C_l$ is the current digital data transfer load, and
  I is the file interactivity factor.

10. The method of claim 9 wherein the first function is further dependent upon the file usage factor.

11. The method of claim 1 wherein said segmenting further comprises the step of:
  determining a file usage factor describing a number of requests for said data object for a period of time.

12. The method of claim 11 wherein the first function to determine the first segment size is:

Seg1=min(SegSize$_{min}$, V/f)

where
  Seg1 is the first segment size,
  min is the minimum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right) + H$$

where
  $N_d$ is the number of computer-readable storage devices available to retain the data object segments,
  $M_l$ is the maximum digital data transfer load,
  $C_l$ is the current digital data transfer load, and
  H is the file usage factor.

13. The method of claim 9 wherein the second function is further dependent upon the file usage factor.

14. The method of claim 13 wherein the second function to determine the remaining segment sizes is:

Segn=max(SegSize$_{min}$, V/f)

where
  Segn is the a segment size for one data object segment of the remaining data object segments,
  max is the maximum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right) + H$$

where
  $N_d$ is the number of computer-readable storage devices available to retain the data object segments, $M_l$ is the maximum digital data transfer load,
  $C_l$ is the current digital data transfer load, and
  H is the file usage factor.

15. The method of claim 1 wherein said segmenting further comprises the steps of:
  determining a file usage factor describing a number of requests for said data object for a period of time; and
  determining a file interactivity factor describing a number of jumps by the second computing system within the data object during processing by said second computing system.

16. The method of claim 15 wherein the first function is further dependent upon the file usage factor and the file interactivity factor.

17. The method of claim 16 wherein the first function to determine the first segment size is:

Seg1=min(SegSize$_{min}$, V/f)

where
  Seg1 is the first segment size,
  min is the minimum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right) + H + I$$

where
  $N_d$ is the number of computer-readable storage devices available to retain the data object segments,
  $M_l$ is the maximum digital data transfer load,
  $C_l$ is the current digital data transfer load,
  H is the file usage factor, and
  I is the file interactivity factor.

18. The method of claim 15 wherein the second function is further dependent upon the file usage factor and the file interactivity factor.

19. The method of claim 18 wherein the second function to determine the remaining segment sizes is:

Segn=max(SegSize$_{min}$, V/f)

where
  Segn is the a segment size for one data object segment of the remaining data object segments,
  max is the maximum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right) + H + I$$

where
  $N_d$ is the number of storage devices available to retain the data object segments,
  $M_l$ is the maximum digital data transfer load,
  $C_l$ is the current digital data transfer load,
  H is the file usage factor, and
  I is the file interactivity factor.

20. The method of claim 1 wherein the data object is a video data file to be transferred isochronously to the second computing system.

21. A digital data service system in communication with a plurality of computing systems to transfer at least one data object of a plurality of data objects to at least one of the plurality of computing systems, comprising:
- a plurality of data object storage devices in communication with each other and with any of the plurality of computing systems for retaining each of said plurality of data objects; and
- a segmentation apparatus in communication with the plurality of data object storage devices to fragment any of the data objects into a plurality of segments to allow transfer to and processing by at least one of the computing systems of said segments, wherein the segmentation apparatus performs said fragmenting by the steps of:
  - requesting a range of addresses within one of said data object storage devices containing said data object,
  - determining a number of said data object storage devices available to retain a plurality of segments of said data object,
  - determining a maximum digital data transfer load for the data object storage devices,
  - assigning a minimum segment size which is the smallest amount of digital data to be contained within one segment of the data object,
  - calculating a first segment size as a first function of a number of the data object storage devices, the current digital data transfer load, the maximum digital data transfer load, and the minimum segment size,
  - assigning a last segment size as the minimum segment size,
  - calculating all remaining segment sizes as a second function of the number of the data object storage devices, the current digital data transfer load, the maximum digital data transfer load, and the minimum segment size, and
  - partitioning said data object into segments whereby the first segment of the data object is of the first segment size, the last segment of the data object is of the last segment size, and all the remaining segments of the data object is of the remaining segment sizes.

22. The system of claim 21 wherein the segmentation apparatus the further performs the steps of:
- assigning one of the number of data object storage devices to retain each segment of the data object;
- assigning an address within the data object storage devices to identify the location of an assigned segment;
- assigning an object name to each segment of the data object; and
- transferring each segment to its assigned data object storage device.

23. The system of claim 21 wherein the first function to determine the first segment size is:

Seg1=min(SegSize$_{min}$, V/f)

where
- Seg1 is the first segment size,
- min is the minimum function of two variables,
- SegSize$_{min}$ is the minimum segment size allowed during the fragmenting of said data object,
- V is a total size of the data object, and
- f is determined by the formula:

$$f = N_d + \left(\frac{M_l}{M_l - C_l}\right)$$

where
- $N_d$ is the number of storage devices available to retain the segments of the data object,
- $M_l$ is the maximum digital data transfer load, and
- $C_l$ is the current digital data transfer load.

24. The system of claim 21 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of said data object,
- V is a total size of the data object, and
- f is determined by the formula:

$$f = N_d + \left(\frac{M_l}{M_l - C_l}\right)$$

where
- $N_d$ is the number of storage devices available to retain the segments of the data object,
- $M_l$ is the maximum digital data transfer load, and
- $C_l$ is the current digital data transfer load.

25. The system of claim 21 wherein the segmentation apparatus the further performs the step of:
- determining a file interactivity factor describing a number of jumps by the computing system within the data object during processing by said second computing system.

26. The system of claim 25 wherein the first function is further dependent upon the file interactivity factor.

27. The system of claim 26 wherein the first function to determine the first segment size is:

Seg1=min(SegSize$_{min}$, V/f)

where
- Seg1 is the first segment size,
- min is the minimum function of two variables
- SegSize$_{min}$ is the minimum segment size allowed during the fragmenting of said data object,
- V is a total size of the data object, and
- f is determined by the formula:

$$f = N_d + \left(\frac{M_l}{M_l - C_l}\right) + I$$

where
- $N_d$ is the number of storage devices available to retain the segments of the data object,
- $M_l$ is the maximum digital data transfer load,
- $C_l$ is the current digital data transfer load, and
- I is the file interactivity factor.

28. The system of claim 21 wherein the second function is further dependent upon the file interactivity factor.

29. The system of claim 28 wherein the second function to determine the remaining segment sizes is:

Segn=max(SegSize$_{min}$, V/f)

where
- Segn is the a segment size for one segment of the remaining segments, max is the maximum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right) + I$$

where
   $N_d$ is the number of storage devices available to retain the segments of the data object,
   $M_l$ is the maximum digital data transfer load,
   $C_l$ is the current digital data transfer load, and
   I is the file interactivity factor.

30. The system of claim 21 wherein the segmentation apparatus the further performs the step of:
   determining a file usage factor describing a number of requests for said data object for a period of time.

31. The system of claim 30 wherein the first function is further dependent upon the file usage factor.

32. The system of claim 31 wherein the first function to determine the first segment size is:

Seg1=min(SegSize$_{min}$, V/f)

where
   Seg1 is the first segment size,
   min is the minimum function of two variables,
   SegSize$_{min}$ is the minimum segment size allowed during the fragmenting of said data object,
   V is a total size of the data object, and
   f is determined by the formula:

$$f = N_d + \left(\frac{M_l}{M_l - C_l}\right) + H$$

where
   $N_d$ is the number of storage devices available to retain the segments of the data object,
   $M_l$ is the maximum digital data transfer load,
   $C_l$ is the current digital data transfer load, and
   H is the file usage factor.

33. The system of claim 30 wherein the second function is further dependent upon the file usage factor.

34. The system of claim 33 wherein the second function to determine the remaining segment sizes is:

Segn=max(SegSize$_{min}$, V/f)

where
   Segn is the a segment size for one segment of the remaining segments,
   max is the maximum function of two variables,
   SegSize$_{min}$ is the minimum segment size allowed during the fragmenting of said data object,
   V is a total size of the data object, and
   f is determined by the formula:

$$f = N_d + \left(\frac{M_l}{M_l - C_l}\right) + H$$

where
   $N_d$ is the number of storage devices available to retain the segments of the data object,
   $M_l$ is the maximum digital data transfer load,
   $C_l$ is the current digital data transfer load, and
   H is the file usage factor.

35. The system of claim 21 wherein the segmentation apparatus the further performs the steps of:
   determining a file usage factor describing a number of requests for said data object for a period of time; and
   determining a file interactivity factor describing a number of jumps by the computing system within the data object during processing by said second computing system.

36. The system of claim 35 wherein the first function is further dependent upon the file usage factor and the file interactivity factor.

37. The system of claim 36 wherein the first function to determine the first segment size is:

Seg1=min(SegSize$_{min}$, V/f)

where
   Seg1 is the first segment size,
   min is the minimum function of two variables,
   SegSize$_{min}$ is the minimum segment size allowed during the fragmenting of said data object,
   V is a total size of the data object, and
   f is determined by the formula:

$$f = N_d + \left(\frac{M_l}{M_l - C_l}\right) + H + I$$

where
   $N_d$ is the number of storage devices available to retain the segments of the data object,
   $M_l$ is the maximum digital data transfer load,
   $C_l$ is the current digital data transfer load,
   H is the file usage factor, and
   I is the file interactivity factor.

38. The system of claim 36 wherein the second function is further dependent upon the file usage factor and the file interactivity factor.

39. The system of claim 38 wherein the second function to determine the remaining segment sizes is:

Segn=max(SegSize$_{min}$, V/f)

where
   Segn is the a segment size for one segment of the remaining segments,
   max is the maximum function of two variables,
   SegSize$_{min}$ is the minimum segment size allowed during the fragmenting of said data object,
   V is a total size of the data object, and
   f is determined by the formula:

$$f = N_d + \left(\frac{M_l}{M_l - C_l}\right) + H + I$$

where
   $N_d$ is the number of storage devices available to retain the segments of the data object,
   $M_l$ is the maximum digital data transfer load,
   $C_l$ is the current digital data transfer load,
   H is the file usage factor, and
   I is the file interactivity factor.

40. The system of claim 21 wherein the data object is a video data file to be transferred isochronously to the computing system.

41. An apparatus for facilitating transfer of a data object retained by at least one computer-readable data storage device in communication with a first computing system from said first computing system to a second computing system and thence to a second computer-readable data storage device, comprising means for segmenting said data object into a plurality of data object segments retained by said computer-readable data storage devices, said means for segmenting said data object comprising:
  means for requesting a range of addresses within said first computer-readable data storage device in communication with the first computing system containing said data object;
  means for determining a number of computer-readable storage devices in communication with said first computing system available to retain a plurality of segments of said data object;
  means for determining a maximum digital data transfer load for the computer-readable storage devices in communication with said first computing system;
  means for assigning a minimum segment size which is the smallest amount of digital data to be contained within one data object segment;
  means for calculating a first segment size as a first function of a number of the computer-readable storage devices, the current digital data transfer load, the maximum digital data transfer load, and the minimum segment size;
  means for assigning a last segment size as the minimum segment size;
  means for calculating all remaining segment sizes as a second function of the number of the computer-readable storage devices, the current digital data transfer load, the maximum digital data transfer load, and the minimum segment size; and
  means for partitioning said data object into a plurality of data object segments retained by said computer-readable data storage devices whereby a first data object segment is of the first segment size, the last data object segment is of the last segment size, and all the remaining data object segments is of the remaining segment sizes.

42. The apparatus of claim 41 wherein said means for segmenting said data object further comprises:
  means for assigning one of the number of computer-readable storage devices to retain each data object segment;
  means for assigning an address within the computer-readable storage devices to identify the location of an assigned segment;
  means for assigning an object name to each data object segment; and
  means for transferring each segment to its assigned computer-readable storage device.

43. The apparatus of claim 41 wherein the first function to determine the first segment size is:

Seg1=min(SegSize$_{min}$, V/f)

where
  Seg1 is the first segment size,
  min is the minimum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right)$$

where
  N$_d$ is the number of computer-readable storage devices available to retain the data object segments,
  M$_l$ is the maximum digital data transfer load, and
  C$_l$ is the current digital data transfer load.

44. The apparatus of claim 41 wherein the second function to determine the remaining segment sizes is:

Segn=max(SegSize$_{min}$, V/f)

where
  Segn is the a segment size for one data object segment of the remaining data object segments,
  max is the maximum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right)$$

where
  N$_d$ is the number of computer-readable storage devices available to retain the data object segments,
  M$_l$ is the maximum digital data transfer load, and
  C$_l$ is the current digital data transfer load.

45. The apparatus of claim 41 wherein said means for segmenting said data object further comprises:
  means for determining a file interactivity factor describing a number of jumps by the second computing system within the data object during processing by said second computing system.

46. The apparatus of claim 45 wherein the first function is further dependent upon the file interactivity factor.

47. The apparatus of claim 46 wherein the first function to determine the first segment size is:

Seg1=min(SegSize$_{min}$, V/f)

where
  Seg1 is the first segment size,
  min is the minimum function of two variables,
  SegSize$_{min}$ is the minimum segment size allowed during the fragmenting of said data object,
  V is a total size of the data object, and
  f is determined by the formula:

$$f = N_d + \left(\frac{M_l}{M_l - C_l}\right) + I$$

where
  N$_d$ is the number of computer-readable storage devices available to retain the data object segments,
  M$_l$ is the maximum digital data transfer load,
  C$_l$ is the current digital data transfer load, and
  I is the file interactivity factor.

48. The apparatus of claim 45 wherein the second function is further dependent upon the file interactivity factor.

49. The apparatus of claim 48 wherein the second function to determine the remaining segment sizes is:

Segn=max(SegSize$_{min}$, V/f)

where
Segn is the a segment size for one data object segment of the remaining data object segments,
max is the maximum function of two variables,
SegSize$_{min}$ is the minimum segment size allowed during the fragmenting of said data object,
V is a total size of the data object, and
f is determined by the formula:

$$f = N_d + \left(\frac{M_I}{M_I - C_I}\right) + I$$

where
$N_d$ is the number of computer-readable storage devices available to retain the data object segments,
$M_I$ is the maximum digital data transfer load,
$C_I$ is the current digital data transfer load, and
I is the file interactivity factor.

50. The apparatus of claim 41 wherein said means for segmenting said data object further comprises:
means for determining a file usage factor describing a number of requests for said data object for a period of time.

51. The apparatus of claim 50 wherein the first function is further dependent upon the file usage factor.

52. The apparatus of claim 51 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_I}{M_I - C_I}\right) + H$$

where
$N_d$ is the number of computer-readable storage devices available to retain the data object segments,
$M_I$ is the maximum digital data transfer load,
$C_I$ is the current digital data transfer load, and
H is the file usage factor.

53. The apparatus of claim 50 wherein the second function is further dependent upon the file usage factor.

54. The apparatus of claim 53 wherein the second function to determine the remaining segment sizes is:

Segn=max(SegSize$_{min}$, V/f)

where
Segn is the a segment size for one data object segment of the remaining segments,
max is the maximum function of two variables,
SegSize$_{min}$ is the minimum segment size allowed during the fragmenting of said data object,
V is a total size of the data object, and
f is determined by the formula:

$$f = N_d + \left(\frac{M_I}{M_I - C_I}\right) + H$$

where
$N_d$ is the number of computer-readable storage devices available to retain the data object segments,
$M_I$ is the maximum digital data transfer load,
$C_I$ is the current digital data transfer load, and
H is the file usage factor.

55. The apparatus of claim 42 wherein said means for segmenting said data object further comprises:
means for determining a file usage factor describing a number of requests for said data object for a period of time; and
means for determining a file interactivity factor describing a number of jumps by the second computing system within the data object during processing by said second computing system.

56. The apparatus of claim 55 wherein the second function is further dependent upon the file usage factor and the file interactivity factor.

57. The apparatus of claim 55 wherein the first function is further dependent upon the file usage factor and the file interactivity factor.

58. The apparatus of claim 57 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_I}{M_I - C_I}\right) + H + I$$

where
$N_d$ is the number of computer-readable storage devices available to retain the data object segments,
$M_I$ is the maximum digital data transfer load,
$C_I$ is the current digital data transfer load,
H is the file usage factor, and
I is the file interactivity factor.

59. The apparatus of claim 57 wherein the second function to determine the remaining segment sizes is:

Segn=max(SegSize$_{min}$, V/f)

where
Segn is the a segment size for one data object segment of the remaining data object segments,
max is the maximum function of two variables,
SegSize$_{min}$ is the minimum segment size allowed during the fragmenting of said data object,
V is a total size of the data object, and
f is determined by the formula:

$$f = N_d + \left(\frac{M_I}{M_I - C_I}\right) + H + I$$

where
$N_d$ is the number of computer-readable storage devices available to retain the data object segments,
$M_I$ is the maximum digital data transfer load,
$C_I$ is the current digital data transfer load,
H is the file usage factor, and
I is the file interactivity factor.

60. The apparatus of claim 41 wherein the data object is a video data file to be transferred isochronously to the second computing system.

61. A computer-readable medium for retaining a computer program code which, when executed on a computing system performs a computer program process for facilitating transfer of a data object retained by a first A method facilitating transfer of a data object retained by a first computer-readable data storage device in communication with a first computing system from said first computing system to a second computing system and thence to a second computer-readable data storage device, whereby said computer program process executes the step of segmenting said data object, said segmenting said data object comprising the steps of:

requesting a range of addresses within a computer-readable storage device in communication with said first computing system containing said data object;

determining a number of computer-readable storage devices in communication with said first computing system available to retain a plurality of segments of said data object;

determining a maximum digital data transfer load for the computer-readable storage devices in communication with said first computing system;

assigning a minimum segment size which is the smallest amount of digital data to be contained within one segment of the data object;

calculating a first segment size as a first function of a number of the computer-readable storage devices, the current digital data transfer load, the maximum digital data transfer load, and the minimum segment size;

assigning a last segment size as the minimum segment size;

calculating all remaining segment sizes as a second function of the number of the computer-readable storage devices, the current digital data transfer load, the maximum digital data transfer load, and the minimum segment size; and partitioning said data object into segments whereby the first segment of the data object is of the first segment size, the last segment of the data object is of the last segment size, and all the remaining segments of the data object is of the remaining segment sizes.

62. The medium of claim 61 wherein performing step of segmenting said data object further comprises the steps of:

assigning one of the number of computer-readable storage devices to retain each segment of the data object;

assigning an address within the computer-readable storage devices to identify the location of an assigned segment;

assigning an object name to each segment of the data object; and transferring each segment to its assigned computer-readable storage device.

63. The medium of claim 61 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right)$$

where
$N_d$ is the number of computer-readable storage devices available to retain the segments of the data object,
$M_l$ is the maximum digital data transfer load, and
$C_l$ is the current digital data transfer load.

64. The medium of claim 61 wherein the second function to determine the remaining segment sizes is:

Segn=max(SegSize$_{min}$, V/f)

where
Segn is the a segment size for one segment of the remaining segments,
max is the maximum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right)$$

where
$N_d$ is the number of computer-readable storage devices available to retain the segments of the data object,
$M_l$ is the maximum digital data transfer load, and
$C_l$ is the current digital data transfer load.

65. The medium of claim 61 wherein performing step of segmenting said data object further comprises the step of:

determining a file interactivity factor describing a number of jumps by the second computing system within the data object during processing by said second computing system.

66. The medium of claim 65 wherein the first function is further dependent upon the file interactivity factor.

67. The medium of claim 66 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of said data object,
V is a total size of the data object, and
f is determined by the formula:

$$f = N_d + \left(\frac{M_l}{M_l - C_l}\right) + I$$

where
$N_d$ is the number of computer-readable storage devices available to retain the segments of the data object,
$M_l$ is the maximum digital data transfer load,
$C_l$ is the current digital data transfer load, and
I is the file interactivity factor.

68. The medium of claim 65 wherein the second function is further dependent upon the file interactivity factor.

69. The medium of claim 68 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of said data object,
- V is a total size of the data object, and
- f is determined by the formula:

$$f = N_d + \left(\frac{M_I}{M_I - C_I}\right) + I$$

where
- N$_d$ is the number of computer-readable storage devices available to retain the segments of the data object,
- M$_I$ is the maximum digital data transfer load,
- C$_I$ is the current digital data transfer load, and
- I is the file interactivity factor.

70. The medium of claim 61 wherein performing step of segmenting said data object further comprises the step of: determining a file usage factor describing a number of requests for said data object for a period of time.

71. The medium of claim 70 wherein the first function is further dependent upon the file usage factor.

72. The medium of claim 71 wherein the first function to determine the first segment size is:

Seg1=min(SegSize$_{min}$, V/f)

where
- Seg1 is the first segment size,
- min is the minimum function of two variables,
- SegSize$_{min}$ is the minimum segment size allowed during the fragmenting of said data object,
- V is a total size of the data object, and
- f is determined by the formula:

$$f = N_d + \left(\frac{M_I}{M_I - C_I}\right) + H$$

where
- N$_d$ is the number of computer-readable storage devices available to retain the segments of the data object,
- M$_I$ is the maximum digital data transfer load,
- C$_I$ is the current digital data transfer load, and
- H is the file usage factor.

73. The medium of claim 70 wherein the second function is further dependent upon the file usage factor.

74. The medium of claim 73 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of said data object,
- V is a total size of the data object, and
- f is determined by the formula:

$$f = N_d + \left(\frac{M_I}{M_I - C_I}\right) + H$$

where
- N$_d$ is the number of computer-readable storage devices available to retain the segments of the data object,
- M$_I$ is the maximum digital data transfer load,
- C$_I$ is the current digital data transfer load, and
- H is the file usage factor.

75. The medium of claim 61 wherein performing step of segmenting said data object further comprises the steps of: determining a file usage factor describing a number of requests for said data object for a period of time; and determining a file interactivity factor describing a number of jumps by the second computing system within the data object during processing by said second computing system.

76. The medium of claim 75 wherein the first function is further dependent upon the file usage factor and the file interactivity factor.

77. The medium of claim 76 wherein the first function to determine the first segment size is:

Seg1=min(SegSize$_{min}$, V/f)

where
- Seg1 is the first segment size,
- min is the minimum function of two variables,
- SegSize$_{min}$ is the minimum segment size allowed during the fragmenting of said data object,
- V is a total size of the data object, and
- f is determined by the formula:

$$f = N_d + \left(\frac{M_I}{M_I - C_I}\right) + H + I$$

where
- N$_d$ is the number of computer-readable storage devices available to retain the segments of the data object,
- M$_I$ is the maximum digital data transfer load,
- C$_I$ is the current digital data transfer load,
- H is the file usage factor, and
- I is the file interactivity factor.

78. The medium of claim 75 wherein the second function is further dependent upon the file usage factor and the file interactivity factor.

79. The medium of claim 78 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of said data object,
- V is a total size of the data object, and
- f is determined by the formula:

$$f = N_d + \left(\frac{M_I}{M_I - C_I}\right) + H + I$$

where
- N$_d$ is the number of computer-readable storage devices available to retain the segments of the data object, $M_l$ is the maximum digital data transfer load,
$C_l$ is the current digital data transfer load,
H is the file usage factor, and
I is the file interactivity factor.

80. The medium of claim 61 wherein the data object is a video data file to be transferred isochronously to the second computing system.

81. A video data file distribution system in communication with a plurality of computing systems for transfer of at least one video data file of a plurality of video data files to at least one of the plurality of computing systems, comprising:
a plurality of video data file retention devices in communication with each other and with any of the plurality of computing systems; and
a segmentation apparatus in communication with the plurality of video data file retention devices to segment any of the video data files into a plurality of segments to allow transfer to and processing by at least one of the computing systems of said segments, wherein the segmentation apparatus performs said segmenting by the steps of:
requesting a range of addresses within a storage device of the first computing system containing said video data file,
determining a number of computer-readable storage devices in communication with said first computing system available to retain a plurality of segments of said video data file,
determining a maximum digital data transfer load for the computer-readable storage devices in communication with said first computing system,
assigning a minimum segment size which is the smallest amount of digital data to be contained within one segment of the video data file,
calculating a first segment size as a first function of a number of the computer-readable storage devices, the current digital data transfer load, the maximum digital data transfer load, and the minimum segment size,
assigning a last segment size as the minimum segment size,
calculating all remaining segment sizes as a second function of the number of the computer-readable storage devices, the current digital data transfer load, the maximum digital data transfer load, and the minimum segment size, and
partitioning said video data file into segments whereby the first segment of the video data file is of the first segment size, the last segment of the video data file is of the last segment size, and all the remaining segments of the video data file is of the remaining segment sizes.

82. The system of claim 81 wherein the segmentation apparatus the further performs the segmenting of the video data file by the steps of:
assigning one of the number of computer-readable storage devices to retain each segment of the video data file; and
assigning an address within the computer-readable storage devices to identify the location of an assigned segment.

83. The system of claim 81 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of the video data file,
V is a total size of the video data file, and
f is determined by the formula:

$$f = N_d + \left(\frac{M_l}{M_l - C_l}\right)$$

where
$N_d$ is the number of computer-readable storage devices available to retain the segments of the video data file,
$M_l$ is the maximum digital data transfer load, and
$C_l$ is the current digital data transfer load.

84. The system of claim 81 wherein the second function to determine the remaining segment sizes is:

Segn=max(SegSize$_{min}$, V/f)

where
Segn is the a segment size for one segment of the remaining segments,
max is the maximum function of two variables,
SegSize$_{min}$ is the minimum segment size allowed during the fragmenting of the video data file,
V is a total size of the video data file, and
f is determined by the formula:

$$f = N_d + \left(\frac{M_l}{M_l - C_l}\right)$$

where
$N_d$ is the number of computer-readable storage devices available to retain the segments of the video data file,
$M_l$ is the maximum digital data transfer load, and
$C_l$ is the current digital data transfer load.

85. The system of claim 81 wherein performing step of segmenting said data object further comprises the step of:
determining a file interactivity factor describing a number of jumps by the computing system within the video data file during processing by at least one of said plurality of computing systems receiving said data object.

86. The system of claim 85 wherein the first function is further dependent upon the file interactivity factor.

87. The system of claim 86 wherein the first function to determine the first segment size is:

Seg1=min(SegSize$_{min}$, V/f)

where
Seg1 is the first segment size,
min is the minimum function of two variables,
SegSize$_{min}$ is the minimum segment size allowed during the fragmenting of the video data file,
V is a total size of the video data file, and
f is determined by the formula:

$$f = N_d + \left(\frac{M_l}{M_l - C_l}\right) + I$$

where
- $N_d$ is the number of computer-readable storage devices available to retain the segments of the video data file,
- $M_l$ is the maximum digital data transfer load,
- $C_l$ is the current digital data transfer load, and
- I is the file interactivity factor.

88. The system of claim 85 wherein the second function is further dependent upon the file interactivity factor.

89. The system of claim 88 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of the video data file,
- V is a total size of the video data file, and
- f is determined by the formula:

$$f = N_d + \left(\frac{M_l}{M_l - C_l}\right) + I$$

where
- $N_d$ is the number of computer-readable storage devices available to retain the segments of the video data file,
- $M_l$ is the maximum digital data transfer load,
- $C_l$ is the current digital data transfer load, and
- I is the file interactivity factor.

90. The system of claim 81 wherein performing step of segmenting said data object further comprises the step of:
determining a file usage factor describing a number of requests for said video data file for a period of time.

91. The system of claim 90 wherein the first function is further dependent upon the file usage factor.

92. The system of claim 91 wherein the first function to determine the first segment size is:

Seg1=min(SegSize$_{min}$, V/f)

where
- Seg1 is the first segment size,
- min is the minimum function of two variables,
- SegSize$_{min}$ is the minimum segment size allowed during the fragmenting of the video data file,
- V is a total size of the video data file, and
- f is determined by the formula:

$$f = N_d + \left(\frac{M_l}{M_l - C_l}\right) + H$$

where
- $N_d$ is the number of computer-readable storage devices available to retain the segments of the video data file,
- $M_l$ is the maximum digital data transfer load,
- $C_l$ is the current digital data transfer load, and
- H is the file usage factor.

93. The system of claim 90 wherein the second function is further dependent upon the file usage factor.

94. The system of claim 93 wherein the second function to determine the remaining segment sizes is:

Segn=max(SegSize$_{min}$, V/f)

where
- Segn is the a segment size for one segment of the remaining segments,
- max is the maximum function of two variables,
- SegSize$_{min}$ is the minimum segment size allowed during the fragmenting of the video data file,
- V is a total size of the video data file, and
- f is determined by the formula:

$$f = N_d + \left(\frac{M_l}{M_l - C_l}\right) + H$$

where
- $N_d$ is the number of computer-readable storage devices available to retain the segments of the video data file,
- $M_l$ is the maximum digital data transfer load,
- $C_l$ is the current digital data transfer load, and
- H is the file usage factor.

95. The system of claim 81 wherein performing step of segmenting said data object further comprises the steps of:
determining a file usage factor describing a number of requests for said video data file for a period of time; and
determining a file interactivity factor describing a number of jumps by at least one of the plurality of computing systems within the video data file during processing by at least one of said plurality of computing systems.

96. The system of claim 95 wherein the first function is further dependent upon the file usage factor and the file interactivity factor.

97. The system of claim 96 wherein the first function to determine the first segment size is:

Seg1=min(SegSize$_{min}$, V/f)

where
- Seg1 is the first segment size,
- min is the minimum function of two variables,
- SegSize$_{min}$ is the minimum segment size allowed during the fragmenting of the video data file,
- V is a total size of the video data file, and
- f is determined by the formula:

$$f = N_d + \left(\frac{M_l}{M_l - C_l}\right) + H + I$$

where
- $N_d$ is the number of computer-readable storage devices available to retain the segments of the video data file,
- $M_l$ is the maximum digital data transfer load,
- $C_l$ is the current digital data transfer load,
- H is the file usage factor, and
- I is the file interactivity factor.

98. The system of claim 95 wherein the second function is further dependent upon the file usage factor and the file interactivity factor.

99. The system of claim 98 wherein the second function to determine the remaining segment sizes is:

Segn=max(SegSize$_{min}$, V/f)

where
  Segn is the a segment size for one segment of the remaining segments,
  max is the maximum function of two variables,
  SegSize$_{min}$ is the minimum segment size allowed during the fragmenting of the video data file,
  V is a total size of the video data file, and
  f is determined by the formula:

$$f = N_d + \left(\frac{M_I}{M_I - C_I}\right) + H + I$$

where
  $N_d$ is the number of computer-readable storage devices available to retain the segments of the video data file,
  $M_I$ is the maximum digital data transfer load,
  $C_I$ is the current digital data transfer load,
  H is the file usage factor, and
  I is the file interactivity factor.

100. The system of claim 81 wherein the video data file is transferred isochronously to the computing system.

* * * * *

UNITED STATES PATENT AND TRADEMARK OFFICE
CERTIFICATE OF CORRECTION

| | |
|---|---|
| PATENT NO. | : 7,246,369 B1 |
| APPLICATION NO. | : 09/748442 |
| DATED | : August 17, 2007 |
| INVENTOR(S) | : Dah-Weih Duan et al. |

Page 1 of 1

It is certified that error appears in the above-identified patent and that said Letters Patent is hereby corrected as shown below:

On the title page
In the Assignees, (73), delete Assignee, "Info Valve Computing, Inc., Elmsbord, NY (US)" and replace with -- InfoValue Computing, Inc., Elmsford, NY (US) --.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,246,369 B1  
APPLICATION NO. : 09/748442  
DATED : July 17, 2007  
INVENTOR(S) : Dah-Weih Duan et al.

Page 1 of 1

It is certified that error appears in the above-identified patent and that said Letters Patent is hereby corrected as shown below:

On the title page  
In the Assignees, (73), delete Assignee, "Info Valve Computing, Inc., Elmsbord, NY (US)" and replace with -- InfoValue Computing, Inc., Elmsford, NY (US) --.

This certificate supersedes Certificate of Correction issued November 20, 2007.

Signed and Sealed this

Twenty-fifth Day of December, 2007

JON W. DUDAS  
*Director of the United States Patent and Trademark Office*